United States Patent
Goto et al.

(10) Patent No.: US 6,891,147 B2
(45) Date of Patent: May 10, 2005

(54) WAVELENGTH-SELECTIVE DIFFRACTION ELEMENT AND AN OPTICAL HEAD DEVICE

(75) Inventors: Ryuichiro Goto, Yokohama (JP); Hiroki Hotaka, Yokohama (JP); Yoshiharu Ooi, Koriyama (JP); Reiko Nozawa, Yokohama (JP); Noriaki Shimodaira, Yokohama (JP); Ryota Murakami, Koriyama (JP)

(73) Assignee: Asahi Glass Company, Limited, Tokyo (JP)

( * ) Notice: Subject to any disclaimer, the term of this patent is extended or adjusted under 35 U.S.C. 154(b) by 113 days.

(21) Appl. No.: 10/639,507

(22) Filed: Aug. 13, 2003

(65) Prior Publication Data

US 2004/0094699 A1 May 20, 2004

Related U.S. Application Data

(63) Continuation of application No. PCT/JP02/01093, filed on Feb. 8, 2002.

(30) Foreign Application Priority Data

Feb. 14, 2001 (JP) ........................................ 2001-037552
Dec. 12, 2001 (JP) ........................................ 2001-378925

(51) Int. Cl.[7] ............................. G02B 5/18; G11B 11/00
(52) U.S. Cl. ................... 250/216; 250/237 R; 359/566; 359/569
(58) Field of Search ............................. 250/201.5, 216, 250/237 R; 359/494, 495, 566, 569, 576; 369/112.03, 112.06; 349/201, 202

(56) References Cited

U.S. PATENT DOCUMENTS

| 5,594,713 A | * | 1/1997 | Komma et al. | ........... 369/44.23 |
| 5,682,265 A | * | 10/1997 | Farn et al. | ................... 359/571 |
| 5,739,352 A | * | 4/1998 | Barner et al. | ................ 548/472 |
| 5,739,952 A | * | 4/1998 | Takeda et al. | ............... 359/495 |
| 6,094,308 A | | 7/2000 | Katsuma | |
| 6,118,586 A | | 9/2000 | Tanabe et al. | |

FOREIGN PATENT DOCUMENTS

| EP | 0 531 926 A1 | 3/1993 |
| EP | 1 001 413 A2 | 5/2000 |
| JP | 4-129040 | 4/1992 |
| JP | 10-27373 | 1/1998 |
| JP | 11-7653 | 1/1999 |
| JP | 2000-76689 | 3/2000 |
| JP | 2000-193812 | 7/2000 |
| JP | 2000-309584 | 11/2000 |
| WO | WO 00/36597 | 6/2000 |

* cited by examiner

*Primary Examiner*—Stephone B. Allen
(74) *Attorney, Agent, or Firm*—Oblon, Spivak, McClelland, Maier & Neustadt, P.C.

(57) ABSTRACT

An optical head device having an optical element capable of transmitting without diffracting light having a wavelength emitted from a two-wavelength semiconductor laser and capable of diffracting light having another wavelength, to provide high utilization efficiency of light in a stable manner.

For this purpose, a wavelength-selective diffraction element 1A comprising a transparent substrate having a front surface on which a grating having a periodically recessed and projected shape in cross section is formed and a filling member 13A filled in the concavo-convex portion 12A of the grating wherein the concavo-convex portion of the grating is provided with an organic pigment having the absorption edge of light in a region having a shorter wavelength than the wavelength $\lambda_1$, and the concavo-convex member and the filling member have the same refractive index with respect to either one of light having a wavelength $\lambda_1$ and light having a wavelength $\lambda_2$, and they have different refractive indices with respect to the other light having a wavelength, is disposed between the light source and the objective lens of the optical head device.

10 Claims, 19 Drawing Sheets

(a)

(b)

(a)

(b)

(a)

(b)

(a)

(b)

(a)

(b)

(a)

(b)

(a)

(b)

(a)

(b)

(a)

(b)

WAVELENGTH-SELECTIVE DIFFRACTION ELEMENT AND AN OPTICAL HEAD DEVICE

This application is a continuation of PCT/JP02/01093 filed on Feb. 8, 2002.

TECHNICAL FIELD

The present invention relates to a wavelength-selective diffraction element and an optical head device. In particular, it relates to a wavelength-selective diffraction element adapted to receive light having two different wavelengths and an optical head device mounting thereon such wavelength-selective diffraction element.

BACKGROUND ART

There have been used various optical head devices for recording information in the information recording surface an optical recording medium such as an optical disk such as CD, DVD or the like, or a magneto-optical disk (hereinbelow, referred to as "the optical disk" as a whole), or reproducing the information in the information recording surface. A diffraction element is used for many purposes in such optical head device.

In the optical head device, the optical disk is rotated while a laser light is focused on a track formed in the information recording surface of the optical disk. Therefore, it is necessary not to deviate focused laser beams from the track. For this, various tracking methods have been developed. Among these tracking methods, a 3-beam method used for recording information is widely known. Further, a push-pull method used for recording information, i.e., a method using a light receiving element divided into two portions in parallel to a track to receive reflection light from an optical disk so that the difference between two divided portions of reflection light is taken, in particular, a differential push-pull method capable of canceling the offset of signals is widely known.

The three-beam method and the differential push-pull method are common in such points that a diffraction element is used, and the main beam as the 0th-order diffraction light and a sub-beam as ±1st-order diffraction lights are generated by the diffraction element.

In order to record or reproduce information in both optical disks of CD and DVD having different standards and structures, a CD-DVD compatible optical head device (hereinbelow, referred to as the compatible optical head device) has been noted in recent years. When a CD series optical disk such as CD-R is used in order to reproduce the information in the compatible optical head device, a semiconductor laser having a 790 nm wavelength band is used. Further, when a DVD series optical disk is used, a semiconductor laser having a 650 nm wavelength band is used for reproducing.

With reference to an example of the construction in FIG. 9, a first conventional optical head device having two semiconductor lasers arranged with a space will be described. Emission lights from semiconductor lasers 3A, 3B are synthesized on the same optical axis by means of a wavelength synthesizing prism 9, and the synthesized light transmits through a beam splitter 4. Then, the light is transformed into a parallel beam by a collimator lens 5, and it transmits through an objective lens 6 to be focused onto the information recording surface of an optical disk 7. The focused light is reflected at the information recording surface, and the reflected light traces reversely the same light path as the coming route.

Namely, the reflected light is transformed again into a parallel beam by the objective lens 6; is collected by the collimator lens 5 and enters into the beam splitter 4. Light reflected at the beam splitter 4 propagates along an optical axis extending with an angle of 90° with respect to the optical axis of the coming route, and is focused on a light receiving plane of a photodetector 8. The light as a signal is converted into an electrical signal by the photodetector 8. In FIG. 9, a 3-beam generating diffracting grating 10 is used for the light having a 790 nm (hereinbelow, it may be referred to as $\lambda_2$) wavelength band.

As a semiconductor laser for emitting light having two wavelengths usable for such optical head device, a two-wavelength semiconductor laser of monolithic structure in which a semiconductor laser having a 790 nm wavelength band and a semiconductor laser having a 650 nm (hereinbelow, it may be referred to as $\lambda_1$) wavelength band are formed in a single chip, for example, is proposed. Further, a two-wavelength semiconductor laser comprising a plurality of chips in which laser chips having different wavelength bands are disposed with an interval of light emitting point of about 100–300 $\mu$m, is proposed recently. By using such semiconductor lasers, the number of parts can be reduced, the size of the device can be reduced and cost for manufacturing can be reduced in comparison with conventional optical head devices having two semiconductor lasers as separate units as shown in FIG. 9. Accordingly, there is a strong demand for the 3-beam generating diffraction grating usable for the two-wavelength semiconductor laser.

A second conventional optical head device using a diffraction element is shown. In the optical head device for recording information in an optical disk, the returning light originated from emission light from a semiconductor laser, which is reflected at the optical disk, is introduced into a light receiving element as a photodetector through a beam splitter. A holographic diffraction element (a holographic beam splitter) is used as such beam splitter.

FIG. 11 is a diagram showing a conventional compatible optical head device using a holographic beam splitter (FIG. 11(a) shows a case of emitting light having a $\lambda_1$ wavelength band and FIG. 11(b) shows a case of emitting light having a $\lambda_2$ wavelength band). An emission light from a semiconductor laser 3 for emitting light having a 650 nm wavelength band and light having a 790 nm wavelength band is transformed into a parallel beam by a collimator lens 5, and the light is focused on a optical disk 7 by means of an objective lens 6. The reflection light from the optical disk 7 is passed again through the objective lens 6 and the collimator lens 5 to reach a light receiving element as a photodetector 8A (FIG. 11(b)) or 8B (FIG. 11(a)) through a holographic beam splitter. The light receiving element converts the received reflection light into an electrical signal. The electrical signal is amplified by an amplifier, and a gain is multiplied to the electrical signal in an automatic gain correction circuit whereby the electrical signal is adjusted to have a predetermined range of signal level. FIG. 11 omits the amplifier and the automatic gain correction circuit.

On the other hand, JP-A-4-129040 discloses a wavelength-selective diffraction element as a CD-DVD compatible diffraction element wherein the optical path difference is made to be integer times as much as the wavelength of either incoming light and the optical path difference is made to be non-integer times as much as the wavelength of the other incoming light. Explanation will be made as follows. The diffraction efficiency of a diffraction grating of two levels (in rectangular shape) in which a ridge and a bottom appear alternately can be expressed by the following approximation formulas where $\lambda$ represents a wavelength, R represents an optical path difference, $\eta_0$ represents the diffraction efficiency of the 0th-order light, $\eta_m$ represents the diffraction efficiency of an mth-order light and m represents an integer other than 0.

$$\eta_0 = [1+\cos(2\pi \times R/\lambda)]^2/4$$

$$\eta_m = [1-\cos(2\pi \times R/\lambda)]^2 \times [1-(-1)^m]^2/(4\pi m^2)$$

When the optical path difference is determined to be integer times as much as the wavelength of either incoming light, the above-mentioned formulas provide $\eta_0=1$ and $\eta_m=0$. Further, when the optical path difference is non-integer times as much as the wavelength of the other incoming light, a wavelength-selective diffraction element providing $0<\eta_0<1$ and $0<\eta_m<1$, can be obtained.

The explanation as to the case of the diffraction element having two levels has been made. However, a wavelength-selective diffraction element can be obtained even when it has the grating of multi-leveled shape, in particular, a pseudo-blazed shape as long as conditions that the optical path difference of one level (one step) is integer times as much as the wavelength of either incoming light and non-integer times as much as the wavelength of the other incoming light are satisfied.

An example of a conventional optical head device utilizing such wavelength-selective diffraction element is described.

FIG. 13 shows a third conventional optical head device in which the wavelength-selective diffraction element is used as an aperture limiting element. An aperture limiting element 18 is made of a glass substrate such as synthesized quartz glass. An example of the construction of a conventional wavelength-selective diffraction element used as the aperture limiting element is shown in FIG. 12. As shown in FIG. 12, a diffraction grating having an optical path difference which is two times as much as the wavelength $\lambda_1$ of a DVD series optical disk, is formed only in a peripheral portion of the aperture limiting element 18. Then, the optical path difference is about 1.6 times as much as the wavelength $\lambda_2$ of a CD series. Accordingly, it can transmit light having a wavelength $\lambda_1$ and diffract at least 70% of the light having the wavelength $\lambda_2$. In FIG. 12, the grating surface of the diffraction grating divided into two portions is for the reason that the light which is diffracted in both the coming and returning routes and propagates on the same light path as the transmitting light without being diffracted, should not be focused on the photodetector.

As shown in FIG. 13, emission lights from semiconductor lasers 3A, 3B are synthesized on the same optical axis by a wavelength synthesizing prism 9, and the synthesized light passes through a beam splitter 4. Then, the transmitting light is transformed into a parallel beam by a collimator lens 5 to be received by the aperture limiting element 18. Light of $\lambda_1$ transmits without being diffracted through the peripheral portion (a shaded portion in FIG. 12(b)) and a central portion (an inner portion of a circle in FIG. 12(b)) of the aperture limiting element 18, and is focused on the information recording surface of a DVD series optical disk 7 by means of an objective lens 6 (FIG. 13(a)).

Further, light of $\lambda_2$ is diffracted at the peripheral portion of the aperture limiting element 18 and only the light passing through the central portion is focused with a smaller aperture on the information recording surface of the optical disk 7 (FIG. 13(b)). The reflected light from the optical disk is again transmitted through the objective lens 6, the aperture limiting element 18 and the collimator lens 5 to be received by the beam splitter 4. The light reflected at the beam splitter 4 propagates along the optical axis extending with an angle of 90° with respect to the light axis of the coming route to be focused on the light receiving surface of a photodetector 8. Then, the light as a signal is converted into an electrical signal in the photodetector 8. Further, the light of $\lambda_2$ diffracted by the aperture limiting element 18 and focused on the information recording surface of the optical disk 7 is reflected at the optical disk, and the reflected light propagates on the same light path as the signal light, and is focused on a portion other than the light receiving surface of the photodetector 8, although there is omission in FIG. 13(b).

FIG. 15 shows a fourth conventional optical head device in which the wavelength-selective diffraction element is used as a wavelength-selective deflection element. The wavelength-selective deflection element is made of a glass substrate such as synthesized quartz glass. FIG. 14 shows another example of the construction of the conventional wavelength-selective diffraction element. It shows a pseudo-blazed diffraction grating 19 of multi-levels such as 5–7 levels (4–6 steps) wherein the optical path difference R of one level (one step) is equal to the wavelength $\lambda_1$ of the DVD series optical disk (although the grating of 6 levels (5 steps) is shown in FIG. 14, the number of levels should not be limited to such).

This diffraction grating can transmit light having the wavelength $\lambda_1$ without being diffracted and diffract at least 60% of light having the wavelength $\lambda_2$ in one of the diffraction orders so that the light is deflected.

As shown in FIG. 15, an emission light having the wavelength $\lambda_1$ emitted from a luminescent point of a two-wavelength semiconductor laser 3 (FIG. 15(a)) and an emission light having the wavelength $\lambda_2$ emitted from the other luminescent point are transformed into parallel beams by a collimator lens 5 after they have passed through a beam splitter 4, and the parallel beams are focused on the information recording surface of an optical disk 7 through an object lens 6.

Reflection lights from the optical disk 7 transmit again through the objective lens 6 and the collimator lens 5 and enter into the beam splitter 4 to be reflected. The reflected lights propagate along the optical axis extending with an angle of 90° with respect to the optical axis of the coming route and are incident into a wavelength-selective deflection element 19. The light having the wavelength $\lambda_1$ entering into the wavelength-selective deflection element 19 transmits through the deflection element 19 without being diffracted, and is focused on the light receiving surface of the photodetector 8 (FIG. 15(a)). On the other hand, the light having the wavelength $\lambda_2$ entering into the wavelength-selective deflection element 19 is deflected at the deflection element 19 and is focused on the same light receiving surface of the photodetector 8 as that for the light having the wavelength $\lambda_1$ (FIG. 15(b)).

In the first conventional optical head device in which the 3-beam generating diffraction element used for the 3-beam method or the differential push-pull method is used in combination of the two-wavelength semiconductor laser, however, the following problem arises. Namely, the diffraction element has the diffraction effect to either an incoming light of a 790 nm wavelength band for a CD series optical disk or an incoming light of a 650 nm wavelength band for a DVD series optical disk whereby diffracted lights are produced. As a result, unwanted diffracted lights as stray lights enter into the photodetector, whereby it is impossible to record or reproduce the information. Further, there is also a problem that the diffraction grating provided to generate three-beams for an incoming light for either optical disk diffracts an incoming light for the other optical disk to produce unwanted diffraction light to thereby cause a loss of light quantity and reduce intensity of signals.

In order to solve such problems, the before-mentioned JP-A-4-129040 discloses the wavelength-selective diffraction element in which the optical path difference is made to be integer times as much as the wavelength of either incoming light and the optical path difference is made to be non-integer times as much as the wavelength of the other incoming light. However, the condition of making the optical path difference of an incoming light having a wavelength band to be integer times as much as the wavelength of the incoming light would restrict flexibility in designing the other wavelength, and flexibility in selecting the diffraction efficiency was also limited, and therefore, the disclosed diffraction element was unsatisfactory.

Further, in the case of the second conventional optical head device, namely, when the holographic beam splitter is used in combination of the two-wavelength semiconductor laser having a monolithic structure, the following problem results. Namely, when light having a wavelength λ is incident into a holographic beam splitter comprising a diffraction element having a pitch of grating P, sin θ is in proportion to λ/P where θ represents a diffraction angle of light. Accordingly, the diffraction angle of light having a 650 nm wavelength band is different from light having a 790 nm wavelength band because of their having different wavelengths. Therefore, it is necessary to increase the light receiving surface area when the diffraction lights are received by a single photodetector.

To increase the light receiving surface area causes deterioration of high frequency characteristics whereby a rapid reproduction of an optical disk is difficult. On the other hand, when light receiving surfaces are formed in the photodetector in order to receive the light having a 650 nm wavelength band and the light having a 790 nm wavelength band, the number of light receiving elements increases twice with the result of a problem that the signal processing circuit becomes complicated.

JP-A-2000-76689 discloses a method of solving this problem, wherein a diffraction grating whose optical path difference is equal to the wavelength $\lambda_1$ of a DVD series is formed in a surface of a substrate, and a diffraction grating whose optical path difference is equal to the wavelength $\lambda_2$ of a CD series is formed in another surface of the substrate so that signals can be detected by a single small-sized photodetector.

The before-mentioned formulas of diffraction efficiency are approximation formulas which satisfy only in a case that the pitch of a diffraction grating is considered to be very large in comparison with the optical path difference of the diffraction grating. Accordingly, when the optical path difference is larger or the grating pitch is smaller, these approximation formulas are not applicable. Even though the optical path difference is made to be n times (n: a natural number) longer than the wavelength, i.e., conditions of $\eta_0=1$ and $\eta_m=0$ are given in these formulas, $\eta_0=1$ is not actually established or $\eta_m=0$ may not be established. The incapability of establishing these approximation formulas is called a resonance of the diffraction grating, and when the grating pitch becomes smaller or the optical path difference becomes larger, the incapability of establishing these approximation formulas appears remarkably.

Usually, the grating pitch of the holographic beam splitter was small as 5 μm or less. Since the grating pitch was small as compared with the optical path difference, there was a problem of causing a reduction of the transmittance of a wavelength to be transmitted, due to the above-mentioned resonance.

In the third conventional optical head device, it was necessary to make the diffraction grating pitch smaller to increase the diffraction angle of the diffracted light so that an unwanted light of a wavelength $\lambda_2$ diffracted by the aperture limiting element did not incident into the light receiving element for signal detection. However, when the diffraction grating pitch was made smaller as described above, the transmittance of the light of a wavelength $\lambda_1$ expected to be transmitted was reduced to thereby reduce the characteristics of the aperture limiting element.

In the fourth conventional optical head device, it was necessary to increase the number of levels of the pseudo-blazed diffraction grating to 5 to 7 in order to allow transmitting the light of a wavelength $\lambda_1$ and to diffract the light of a wavelength $\lambda_2$. The increment of the number of levels resulted that the optical path difference in total was 4 to 6 times longer than the wavelength $\lambda_1$, whereby the transmittance of the light of a wavelength $\lambda_1$ expected to be transmitted was reduced, and the characteristics as the wavelength-selective diffraction element were reduced.

It is an object of the present invention to solve the above-mentioned problems and to provide a wavelength-selective diffraction element providing a large degree of freedom in designing, i.e., allowing optional determination of the diffraction efficiency; avoiding producing no optical path difference with respect to light of a wavelength expected to be transmitted, and causing no reduction of the transmittance of the light having a wavelength expected to be transmitted even though the plating pitch is small.

Further, the present invention is to provide an optical head device provided with such wavelength-selective diffraction element and a two-wavelength semiconductor laser to record and reproduce information stably.

DISCLOSURE OF THE INVENTION

In accordance with the present invention, there is provided a wavelength-selective diffraction element comprising a transparent substrate a grating comprising a concavo-convex member having a periodically recessed and projected shape formed on a front surface of the transparent substrate and a filling member filled in at least a recessed portion of the grating, which is adapted to receive two kinds of light having a wavelength $\lambda_1$ and a wavelength $\lambda_2$ ($\lambda_1<\lambda_2$), characterized in that either of the concavo-convex member or the filling member contains an organic pigment having the absorption edge of light in a region having a shorter wavelength than the wavelength $\lambda_1$: the concavo-convex member and the filling member have the same refractive index with respect to either one of light having a wavelength $\lambda_1$ and light having a wavelength of $\lambda_2$, and they have different refractive indices with respect to the other light having a wavelength.

Further, there is provided the above-mentioned wavelength-selective diffraction element wherein a transparent substrate other than said transparent substrate is disposed to oppose to said transparent substrate with respect to the concavo-convex member.

Further, there is provided the above-mentioned wavelength-selective diffraction element wherein said concavo-convex member contains an organic pigment having the absorption edge of light in a region having a shorter wavelength than the wavelength $\lambda_1$.

Further, there is provided the above-mentioned wavelength-selective diffraction element wherein said filling member contains an organic pigment having the absorption edge of light in a region having a shorter wavelength than the wavelength $\lambda_1$.

Further, there is provided the above-mentioned wavelength-selective diffraction element wherein said concavo-convex member and said filling member have the same refractive index with respect to the light having a wavelength $\lambda_1$.

Further, there is provided the wavelength-selective diffraction element according to claim 1 wherein said concavo-convex member and said filling member have the same refractive index with respect to the light having a wavelength $\lambda_2$.

Further, there is provided the above-mentioned wavelength-selective diffraction element wherein the grating having a periodically recessed and projected shape is formed only in a peripheral portion of the front surface of the transparent substrate.

Further, there is provided the above-mentioned wavelength-selective diffraction element wherein the grating having a periodically recessed and projected shape has a blazed shape or a pseudo-blazed shape.

Further, there is provided a wavelength-selective diffraction element comprising said wavelength-selective diffraction element wherein the light having a wavelength $\lambda_1$ is transmitted without being diffracted and the light having a wavelength $\lambda_2$ is diffracted, and said wavelength-selective diffraction element wherein the light having a wavelength $\lambda_2$ is transmitted without being diffracted and the light having a wavelength $\lambda_1$ is diffracted, wherein these wavelength-selective diffraction elements are laminated.

Further, there is provided a wavelength-selective diffraction element comprising said wavelength-selective diffraction element wherein the light having a wavelength $\lambda_1$ is transmitted without being diffracted and the light having a wavelength $\lambda_2$ is diffracted, and said wavelength-selective diffraction element wherein the light having a wavelength $\lambda_2$ is transmitted without being diffracted and the light having a wavelength $\lambda_1$ is diffracted, wherein these wavelength-selective diffraction elements are laminated, and a phase plate is laminated at an outside of the laminated wavelength-selective diffraction elements.

Further, there is provided a wavelength-selective diffraction element comprising said wavelength-selective diffraction element wherein the light having a wavelength $\lambda_1$ is transmitted without being diffracted and the light having a wavelength $\lambda_2$ is diffracted, and said wavelength-selective diffraction element wherein the light having a wavelength $\lambda_2$ is transmitted without being diffracted and the light having a wavelength $\lambda_1$ is diffracted, and a phase plate disposed between said wavelength-selective diffraction elements.

Further, there is provided the above-mentioned wavelength-selective diffraction element wherein the organic pigment is a red organic pigment.

Further, there is provided an optical head device comprising a light source for emitting two kinds of light having a wavelength $\lambda_1$ and a wavelength $\lambda_2$, an objective lens for collecting the two kinds of light to an optical recording medium and a photodetector for detecting reflection light of the two kinds of light reflected at the optical recording medium, characterized in that said wavelength-selective diffraction element is disposed in an optical path between the light source and the objective lens.

BEST MODE FOR CARRYING OUT THE INVENTION (First Embodiment of the Wavelength-Selective Diffraction Element)

Figure 1:
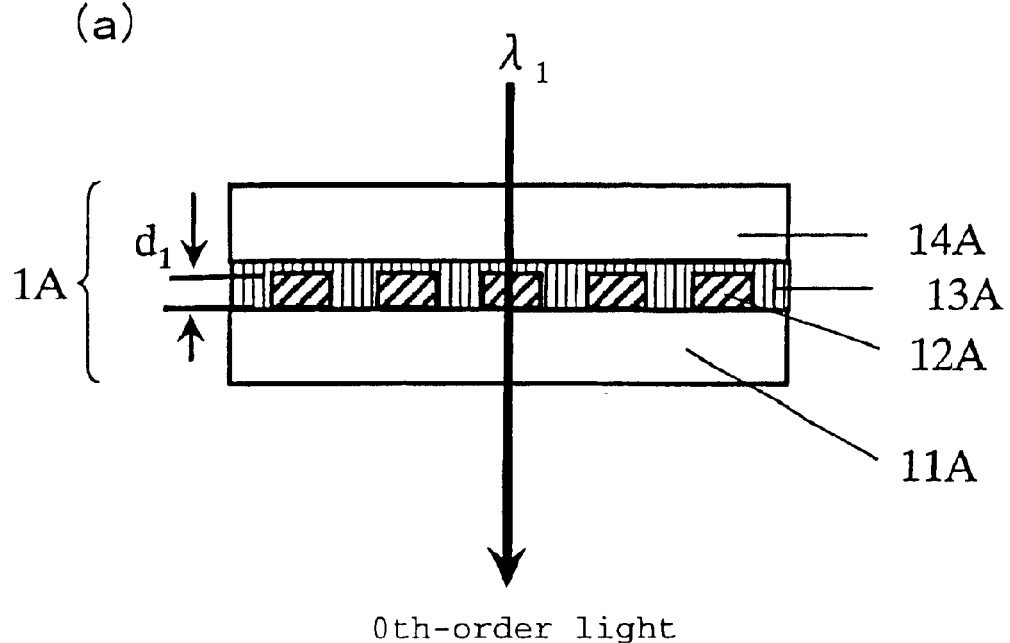
FIG. 1 is a diagram showing a first embodiment of the wavelength-selective diffraction element of the present invention wherein (a) is a side view showing a state that light of a wavelength $\lambda_1$ enters, and (b) is a side view showing a state that light of a wavelength $\lambda_2$ enters.
Figure 1:
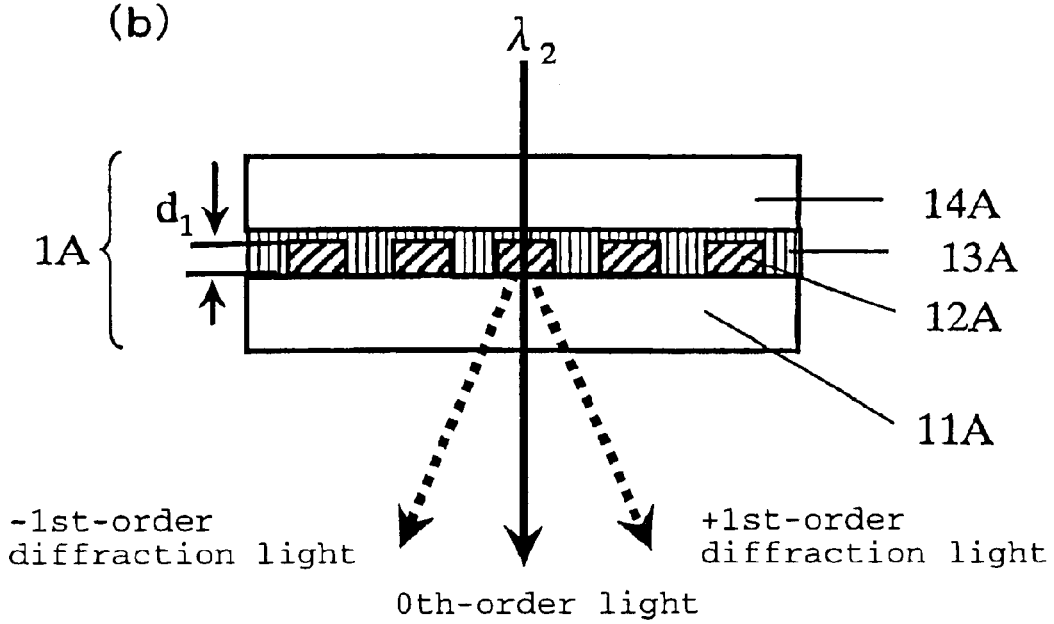

FIG. 1 shows states that light having a wavelength $\lambda_1$ and a wavelength $\lambda_2$ ($\lambda_1 < \lambda_2$) enter into the wavelength-selective diffraction element 1A in the present embodiment (FIG. 1(a) shows a state that light of a wavelength $\lambda_1$ enters, and FIG. 1(b) shows a state that light of a wavelength $\lambda_2$ enters). The wavelength-selective diffraction element 1A is a diffraction element provided with a transparent substrate 11A having a front surface on which a diffraction grating 12A having recessed and projected portions as a grating (which is comprised of a concavo-convex member) and a filling member 13A filled in the space. A transparent substrate 14A protects the filling member 13A. The refractive index of the diffraction grating 12A is equal to that of the filling member 13A with respect to the light of a wavelength $\lambda_1$, and the refractive index of the diffracting grating 12A is different from that of the filling member 13A with respect to the light of a wavelength $\lambda_2$.

Here, either of the diffraction grating 12A or the filling member 13A contains an organic pigment having the absorption edge (wavelength) of light in a region having a shorter wavelength than the wavelength $\lambda_1$. The inclusion of the organic pigment means that the concavo-convex member or the filling member contains actually an organic pigment or that the organic pigment itself constitutes either one of the above-mentioned both members. However, in many cases, the organic pigment is contained in either member, and accordingly, description will be made as to the case that the organic pigment is contained actually, For example, when the organic pigment is contained in the diffraction grating 12A, the refractive index difference of the diffraction grating 12A with respect to the wavelength $\lambda_1$ and the wavelength $\lambda_2$ due to the anomalous dispersion effect can be made larger than the refractive index difference of the filling member 13A. Accordingly, when a material for the diffraction grating 12A containing an organic pigment and a material for the filling member 13A are selected appropriately (and the organic pigment is also selected appropriately), the refractive index difference of these materials with respect to the wavelength $\lambda_1$ can be made 0, and the refractive index difference with respect to the wavelength $\lambda_2$ can be increased.

Accordingly, when the light of a wavelength $\lambda_1$ transmits through the diffraction grating 12A, the light propagates lectinearly because of their having equal refractive indices, and the diffraction element does not function as a diffraction grating. On the other hand, when the light of a wavelength $\lambda_2$ transmits, it functions as a diffraction grating because of different refractive indices. The diffraction efficiency can be changed by adjusting the height $d_1$ and the shape of the diffraction grating 12A. Further, the angle of diffraction can be changed by changing the grating pitch of the diffraction grating 12A. Here, the refractive index difference due to an anomalous dispersion effect is not utilized for an anomalous dispersion area in the dispersion curve but for an area which is deviated from the anomalous dispersion area but exhibits a large change of refractive index due to an anomalous dispersion effect. The refractive index shifts as a whole to a higher side in the entire wavelength region in a normal dispersion area. Accordingly, such effect can also be utilized. This explanation applies as well in the following description.

As mentioned above, the case that an organic pigment is contained in the diffraction grating 12 has been explained. However, the same effect is obtainable even in a case that an organic pigment is contained in the filling member 13A.

The organic pigment is advantageous in the point that wavelength dispersibility (wavelength dependence of the refractive index) can easily be changed by changing the molecular structure or the substituent. Further, the organic pigment is excellent in heat resistance and irradiation resistance and has durability unlike dyestuff.

As the refractive index difference between the concavo-convex member and the filling member with respect to the wavelength $\lambda_2$ is larger, it is preferable that the depth of the grating can be reduced and the incident angle dependence of the diffraction efficiency can be reduced. However, in consideration of the relation between dispersibility of the refractive index and the absorption quantity of an actually utilized optical material with respect to the wavelength $\lambda_2$, the refractive index difference can be a value from 0.02 to 0.10.

(Second Embodiment of the Wavelength-Selective Diffraction Element)

Figure 2:
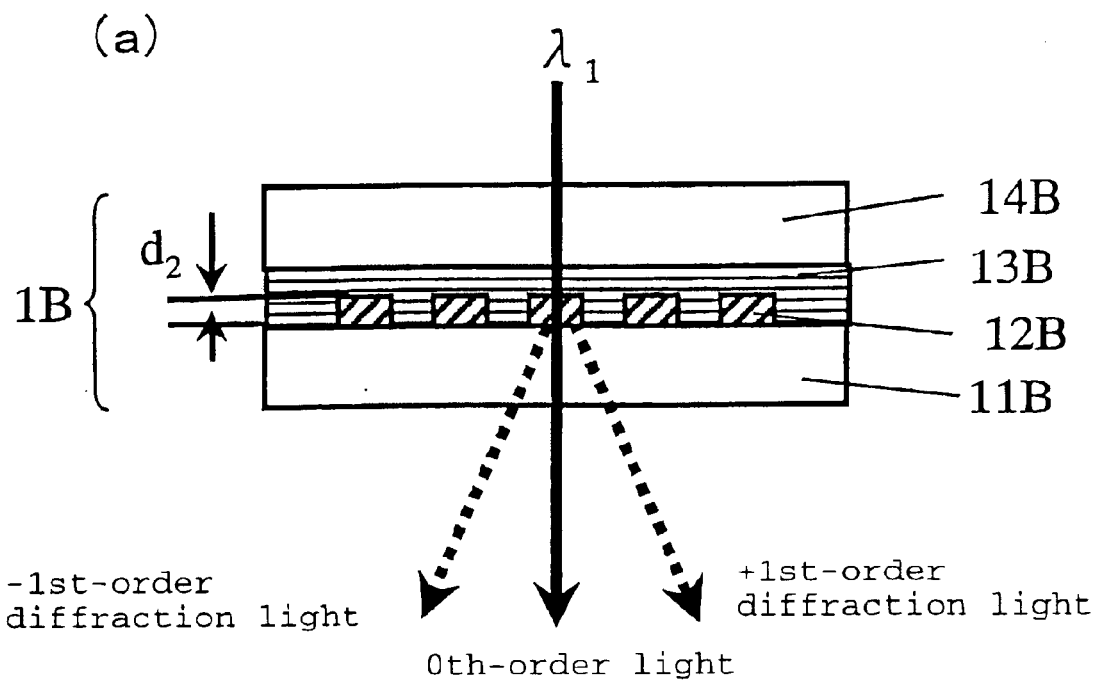
FIG. 2 is a diagram showing a second embodiment of the wavelength-selective diffraction element of the present invention wherein (a) is a side view showing a state that light of a wavelength $\lambda_1$ enters, and (b) is a side view showing a state that light of a wavelength $\lambda_2$ enters.
Figure 2:
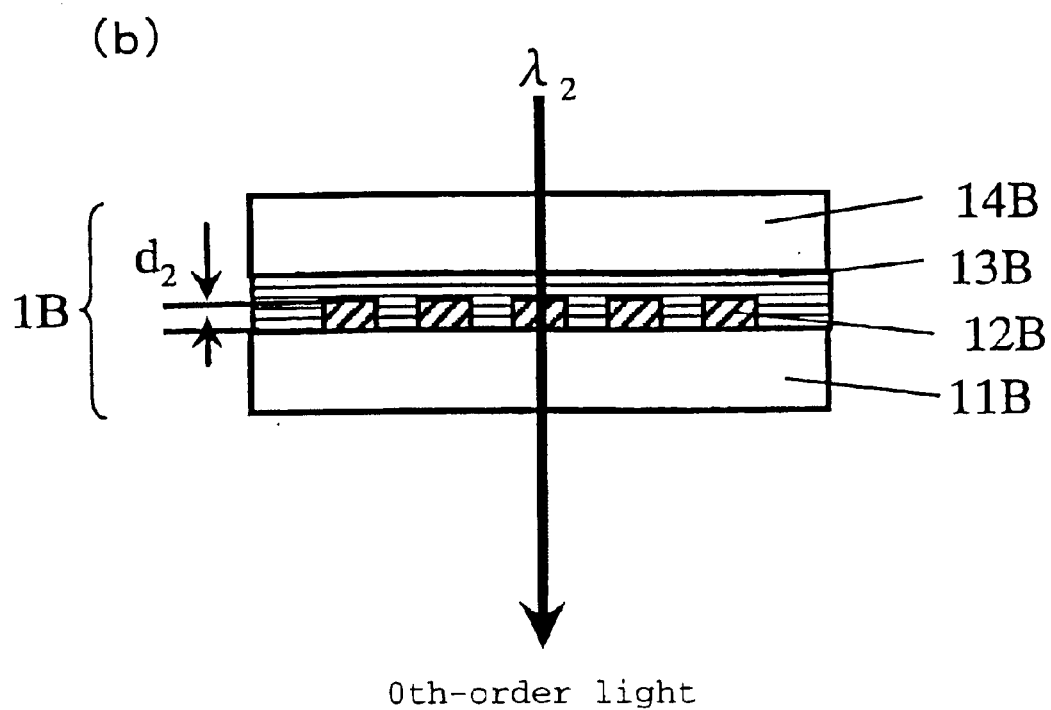

The wavelength-selective diffraction element 1B of this embodiment shown in FIG. 2 is a diffraction element provided with a transparent substrate having a front surface on which a diffraction grating 12B made of a concavo-convex member is formed and a filling member 13B filled in the space. The refractive index of the diffraction grating 12B is different from that of the filling member 13B with respect to light of a wavelength $\lambda_1$ (FIG. 1(a)), and the refractive index of the diffraction grating 12B is equal to that of the filling member 13B with respect to light of a wavelength $\lambda_2$ (FIG. 1(b)). Although alphabets in 11B, 14B are different from those of 11A, 14A, elements having the same figures denote the same structural elements as in FIG. 1, and denote transparent substrates.

In this embodiment too, either the diffraction grating 12B or the filling member 13B contains an organic pigment having the absorption edge of light in a region having a shorter wavelength than the wavelength $\lambda_1$. For example, when the organic pigment is contained in the diffraction grating 12B, the refractive index difference of the diffraction grating 12B with respect to the wavelength $\lambda_1$ and the wavelength $\lambda_2$ due to the anomalous dispersion effect can be made larger than the refractive index difference of the filling member 13B. Accordingly, when a material for the diffraction grating 12B containing the organic pigment and a material for the filling member 13B are selected appropriately (and the organic pigment is also selected appropriately), the refractive index difference between these materials with respect to the wavelength $\lambda_1$ can be increased and the refractive index difference with respect to the wavelength $\lambda_2$ can be made 0.

In this case, when the light of a wavelength $\lambda_1$ transmits through the diffraction grating 12B, the wavelength-selective diffraction element 1B functions as a diffraction grating, and the light is diffracted at a specified angle depending on the magnitude of the grating pitch. The transmitting efficiency of a linearly propagating light and the diffraction efficiency of a diffracted light can be changed by changing the height $d_2$ or the shape of the diffraction grating 12B. On the other hand, the light of a wavelength $\lambda_2$ transmits linearly without being diffracted.

(Third Embodiment of the Wavelength-Selective Diffraction Element)

Figure 3:
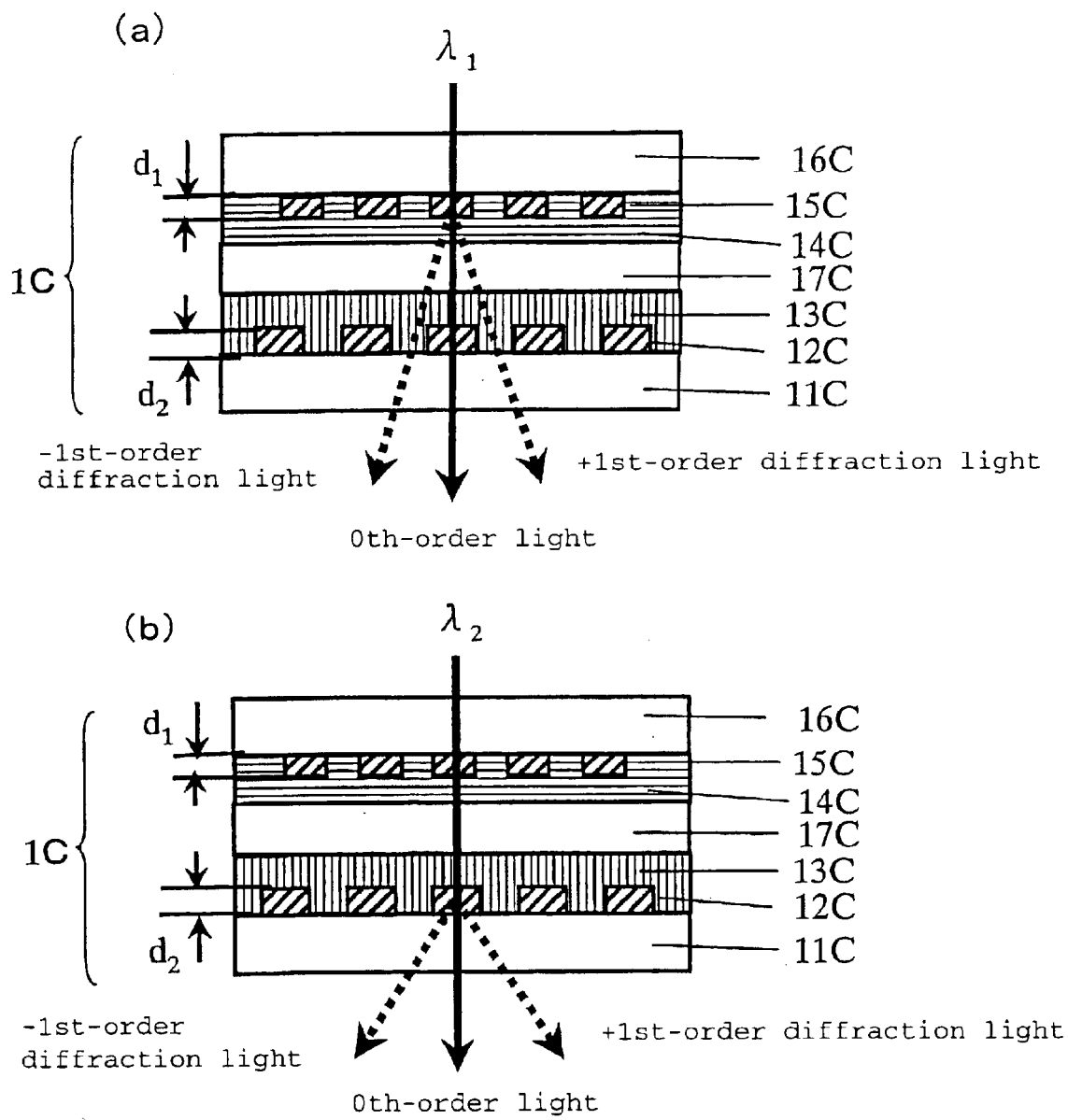
FIG. 3 is a diagram showing a third embodiment of the wavelength-selective diffraction element of the present invention, the wavelength-selective diffraction element being formed by laminating wavelength-selective diffraction elements shown in FIGS. 1 and 2, wherein (a) is a side view showing a state that light of a wavelength $\lambda_1$ enters, and (b) is a side view showing a state that light of a wavelength $\lambda_2$ enters.

The wavelength-selective diffraction element 1C of this embodiment shown in FIG. 3 is formed by combining wavelength-selective diffraction elements in the first and second embodiments. The wavelength-selective diffraction element 1C has a lamination structure comprising a transparent substrate 11C having a front surface on which a diffraction grating 12C is formed, a transparent substrate 16C having a front surface on which a diffraction grating 15 is formed, and a transparent substrate 17C interposed between filling members 13C and 14C. Here, the refractive index of the diffraction grating 12C is equal to that of the filling member 13C with respect to light having a wavelength $\lambda_1$, and the refractive index of the diffraction grating 12C is different from that of the filling member 13C with respect to light having a wavelength $\lambda_2$.

Further, the refractive index of the diffraction grating 15C is different from that of the filling member 14C with respect to the light of a wavelength $\lambda_1$, and the refractive index of the diffraction grating 15C is equal to that of the filling member 14C with respect to the light of a wavelength $\lambda_2$. The wavelength-selective diffraction element 1C show in FIG. 3(a) comprises an upper portion as shown in FIG. 2(a) and a lower portion as shown in FIG. 1(a). Accordingly, the light of a wavelength $\lambda_1$ is diffracted by the diffraction grating 15C and transmits through the diffraction grating 12C. Thus, only the diffraction grating 15C functions as a diffraction grating.

On the other hand, the wavelength-selective diffraction element 1C shown in FIG. 3(b) comprises an upper portion as shown in FIG. 2(b) and a lower portion as shown in FIG. 1(b). Accordingly, the light of a wavelength $\lambda_2$ transmits through the diffraction grating 15C and is diffracted by the diffraction grating 12C. Thus, only the diffraction grating 12C functions as a diffraction grating. Accordingly, the wavelength-selective diffraction element is an integrally combined element functioning independently to two kinds of wavelength.

(Fourth Embodiment of the Wavelength-Selective Diffraction Element)

Figure 4:
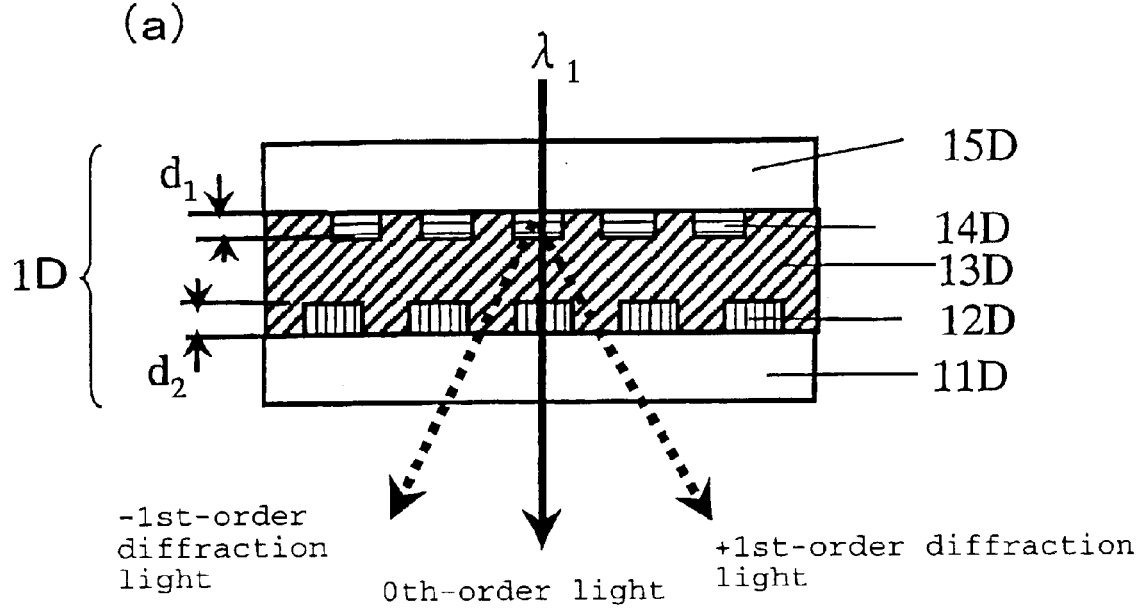
FIG. 4 is a diagram showing a fourth embodiment of the wavelength-selective diffraction element of the present invention, the wavelength-selective diffraction element being formed by laminating wavelength-selective diffraction elements shown in FIGS. 1 and 2, wherein (a) is a side view showing a state that light of a wavelength $\lambda_1$ enters, and (b) is a side view showing a state that light of a wavelength $\lambda_2$ enters.
Figure 4:
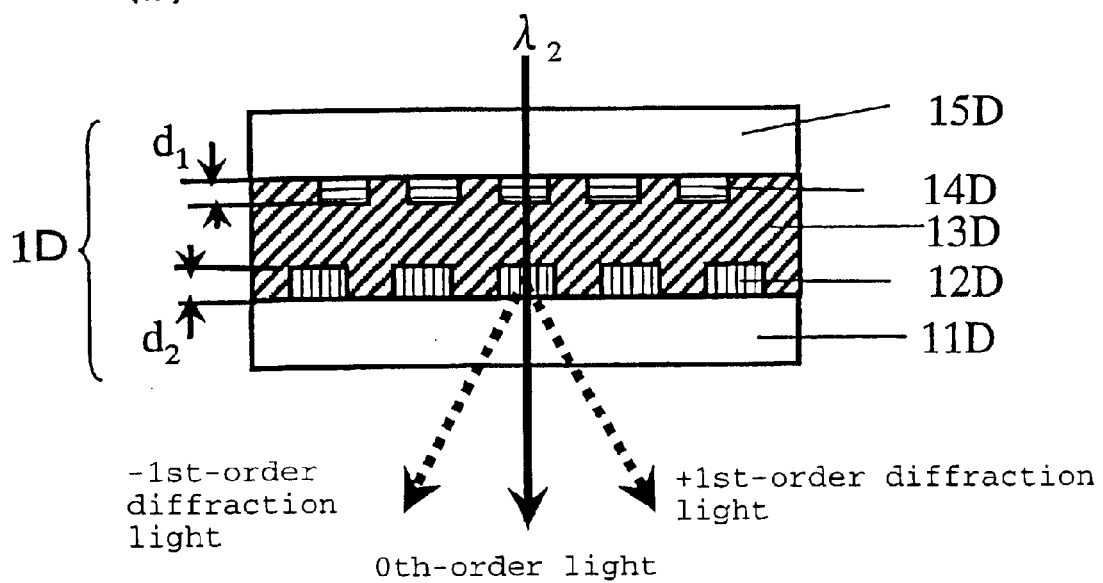

The wavelength-selective diffraction element 1D in this embodiment shown in FIG. 4 may have a lamination structure comprising a transparent substrate 11D on which a diffraction grating 12D is formed and a transparent substrate 15D on which a diffraction grating 14D is formed wherein the diffraction grating 12D and the diffraction grating 14D face each other by interposing a filling member 13D, without using the transparent substrate 17C in the wavelength-selective diffraction element 1C as shown in FIG. 3. The relation of the refractive index difference between the filling member and the diffraction grating with respect to wavelengths $\lambda_1$ and $\lambda_2$ is the same as that in the third embodiment.

Even in the fourth embodiment, the organic pigment is contained in diffraction gratings 12D and 14D or the filling member 13D. In the case of the wavelength-selective diffraction element shown in FIG. 4(a), the light of a wavelength $\lambda_1$ is diffracted by the diffraction grating 14D and is transmits through the diffraction grating 12D without being diffracted, whereby only the diffraction grating 14D functions as a diffraction grating. On the other hand, in the case of the wavelength-selective diffraction element 1D shown in FIG. 4(b), the light of a wavelength $\lambda_2$ transmits through the diffraction grating 14D and is diffracted by the diffraction grating 12D, whereby only the diffraction grating 14D functions as a diffraction grating.

Accordingly, in this embodiment too, an integrally combined element functions as a diffraction element independently with respect to two kinds of wavelength.

(Fifth Embodiment of the Wavelength-Selective Diffraction Element)

Figure 5:
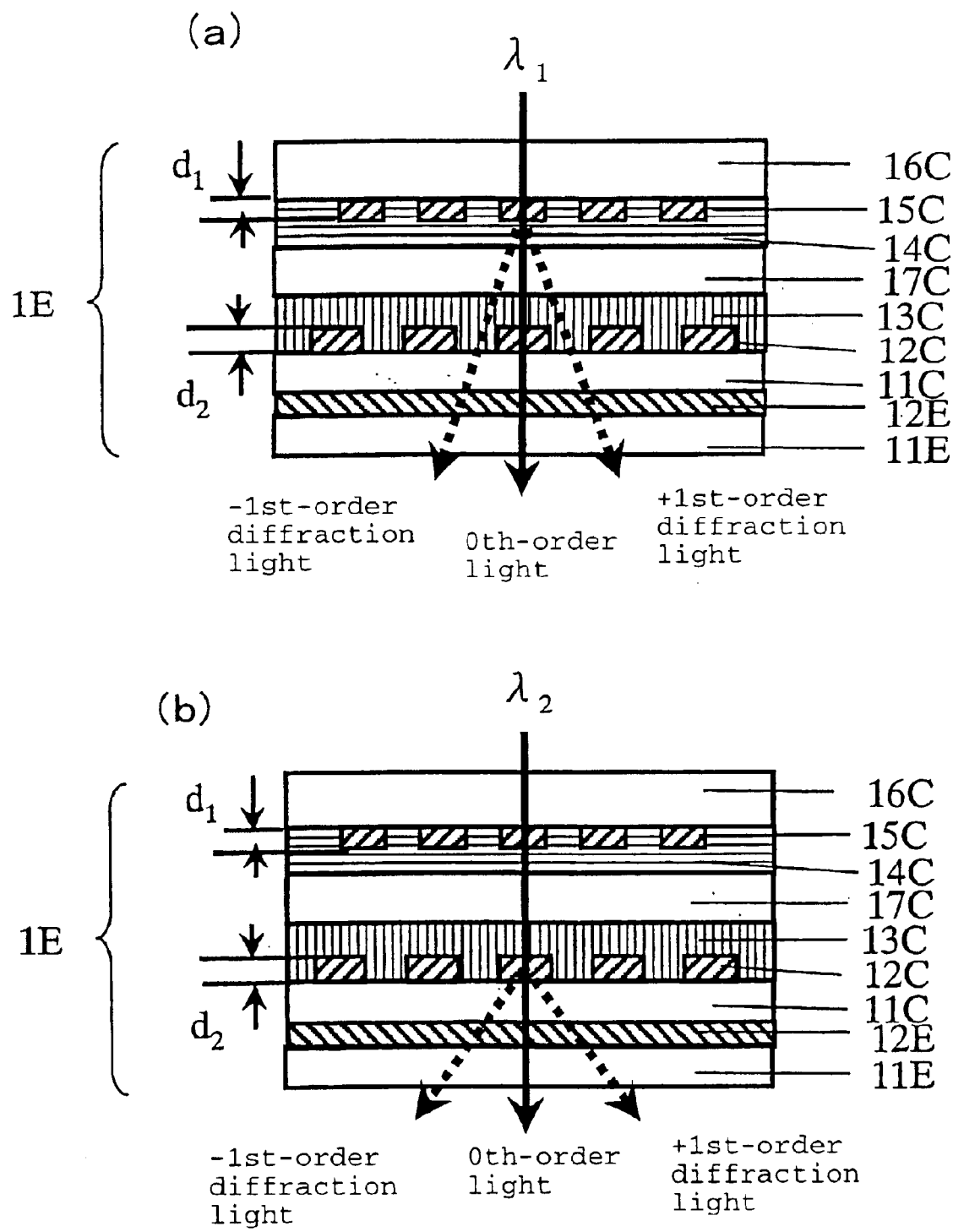
FIG. 5 is a diagram showing a fifth embodiment of the wavelength-selective diffraction element of the present invention, the wavelength-selective diffraction element being formed in combination of the wavelength-selective diffraction element in FIG. 3 and a phase plate, wherein (a) is a side view showing a state that light of a wavelength $\lambda_1$ enters, and (b) is a side view showing a state that light of a wavelength $\lambda_2$ enters.

The wavelength-selective diffraction element 1E of this embodiment shown in FIG. 5 comprises the wavelength-selective diffraction element 1C used in the third embodiment, a phase plate 12E disposed at an outer side (a lower side in the figure) of the transparent substrate 11C and a transparent substrate 11E placed on the phase plate. For the phase plate 12E, a half-wave plate, a quarter-wave plate or the like may be used. When the phase plate 12E is formed integrally with the wavelength-selective diffraction element, the diffraction effect and an effect of changing polarization can preferably be provided to an incoming light in spite of small-sized structure.

FIG. 5(a) shows a state that the light of a wavelength $\lambda_1$ is diffracted by the diffraction grating 15C whereby the 0th-order diffraction light and ±1st-order diffraction lights transmit through the phase plate 12E, and FIG. 5(b) shows a state that the light of a wavelength $\lambda_2$ is diffracted by the diffraction grating 12C and the 0th-order diffraction light and ±1st-order diffraction lights transmit through the phase plate 12E.

(Sixth Embodiment of the Wavelength-Selective Diffraction Element)

Figure 6:
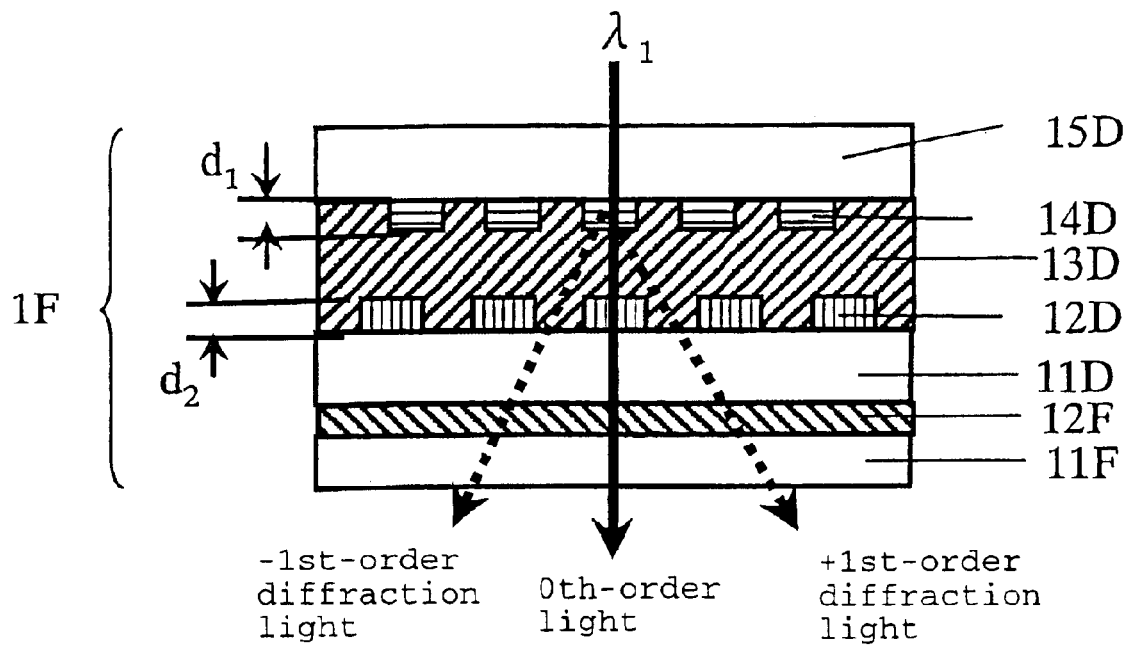
FIG. 6 is a diagram showing a sixth embodiment of the wavelength-selective diffraction element of the present invention, the wavelength-selective diffraction element being formed in combination of the wavelength-selective diffraction element in FIG. 4 and a phase plate, wherein (a) is a side view showing a state that light of a wavelength $\lambda_1$ enters, and (b) is a side view showing a state that light of a wavelength $\lambda_2$ enters.
Figure 6:
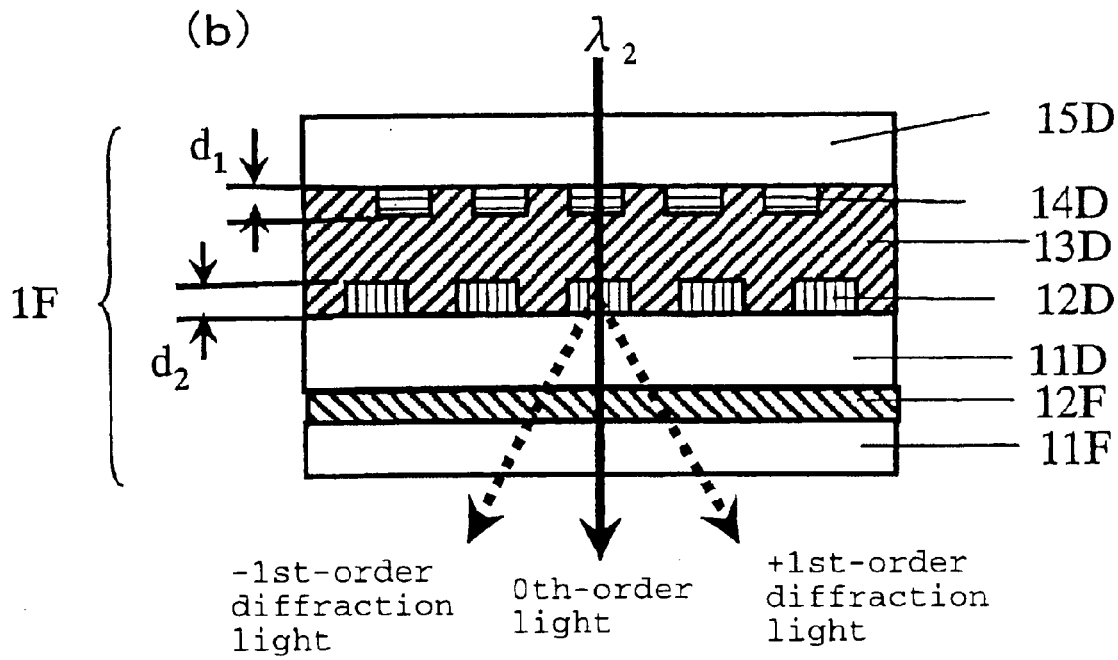

The wavelength-selective diffraction element 1F in this embodiment shown in FIG. 6 comprises the wavelength-selective diffraction element used in the fourth embodiment, a phase plate 12F disposed at the outside of the transparent substrate 11D and a transparent substrate 11F disposed on the phase plate. FIG. 6(a) shows a state that light of a wavelength $\lambda_1$ enters, and FIG. 6(b) shows a state that light of a wavelength $\lambda_2$ enters. When the phase plate 12F is formed integrally with the wavelength-selective diffraction element, the diffraction effect and an effect of changing the polarization of the incoming light can preferably be provided while it has a size smaller than the wavelength-selective diffraction element 1E according to the fifth embodiment. Further, in the wavelength-selective diffraction element 1F, the number of the transparent substrates can be lessened by one in comparison with the wavelength-selective diffraction element 1E. Accordingly, the number of manufacturing steps can preferably be reduced.

(Seventh Embodiment of the Wavelength-Selective Diffraction Element)

Figure 7:
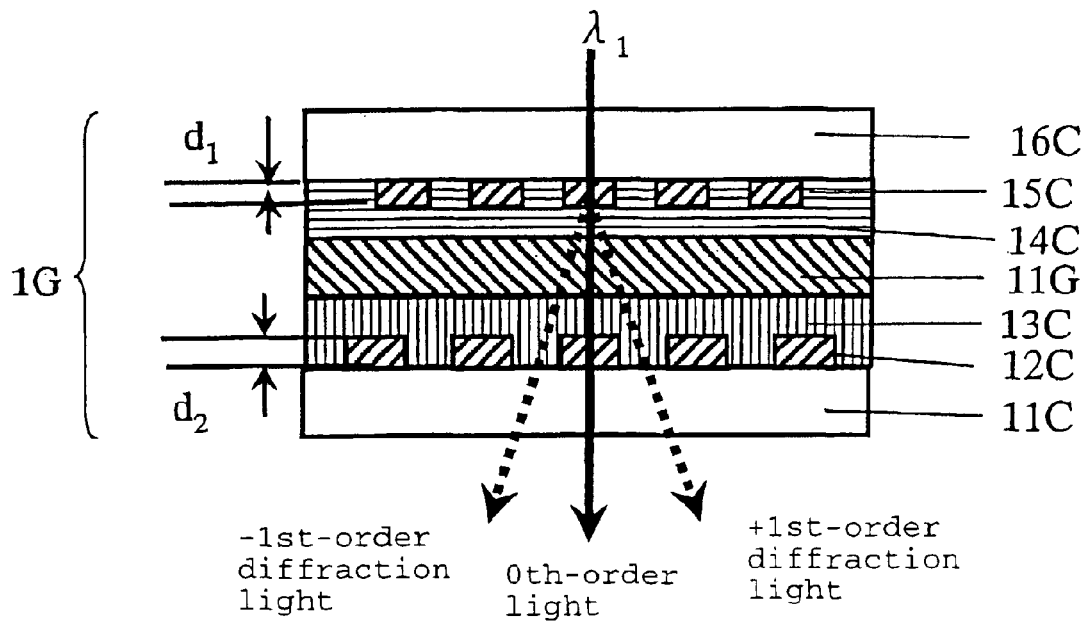
FIG. 7 is a diagram showing a seventh embodiment of the wavelength-selective diffraction element of the present invention, the wavelength-selective diffraction element being formed in combination of the wavelength-selective diffraction element in FIG. 3 and a phase plate, wherein (a) is a side view showing a state that light of a wavelength $\lambda_1$ enters, and (b) is a side view showing a state that light of a wavelength $\lambda_2$ enters.
Figure 7:
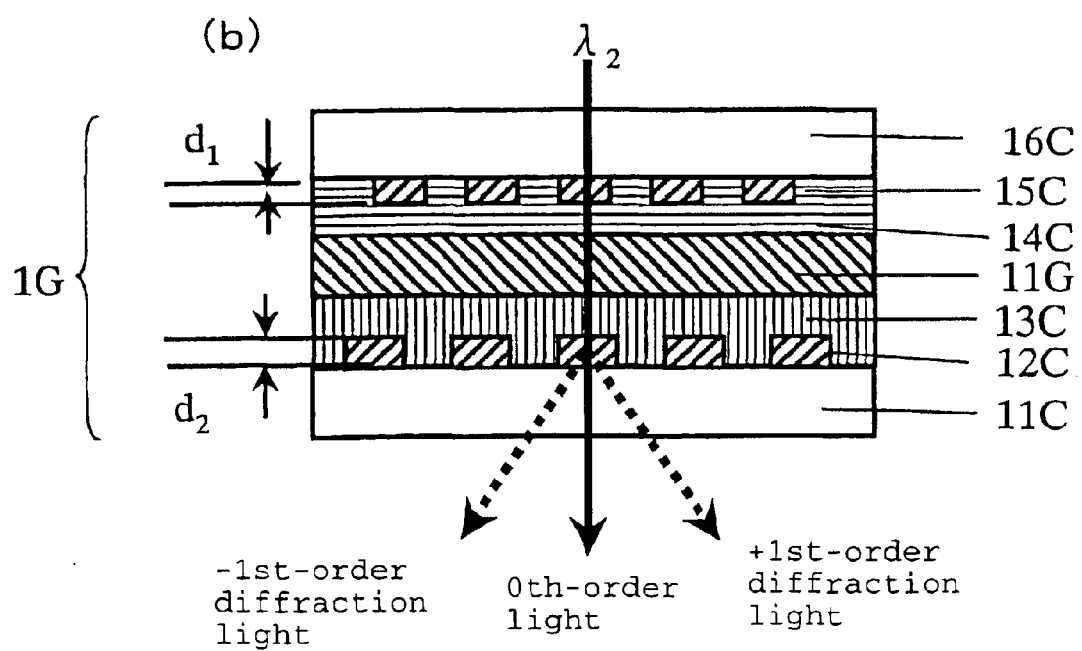

The wavelength-selective diffraction element 1G in this embodiment shown in FIG. 7 is similar to that of the fifth embodiment provided that the phase plate used in the fifth embodiment is omitted and a phase plate 11G is interposed between filling members 13C and 14C. In this case, the organic pigment may be contained in both diffraction gratings 15C, 12C or may be contained in both the filling members 14C, 13C. Or, it may be contained in the diffraction grating 15C and the filling member 13C, or in the filling member 14C and the diffraction grating 12C. As the phase plate 11G, a half-wave plate, a quarter-wave plate or the like may be mentioned.

As shown in FIG. 7(a), light of a wavelength $\lambda_1$ is incident into the diffraction grating 15C, and is separated into ±1st-order diffraction lights. On the other hand, the 0th-order diffraction light transmits therethrough. These lights enter into the phase plate 11G at which states of polarization of the ±1st-order diffraction lights and the 0th-order diffraction light are changed. Then, these lights enter into the diffraction grating 12C. However, they transmit therethrough without being diffracted because refractive indices of 13C and 12C are equal.

As shown in FIG. 7(b), light of a wavelength $\lambda_2$ enters into the diffraction grating 15C. However, the light transmits therethrough without being diffracted to enter into the phase plate 11G at which the state of polarization is changed. Then, the light enters into the diffraction grating 12C at which the incident light is separated into ±1st-order diffraction lights and the 0th-order diffraction light.

As shown in FIG. 7, when the phase plate 11G is disposed between the diffraction gratings 15C and 12C, the number of the transparent substrates can be lessened by one in the wavelength-selective diffraction element 1G in comparison with the wavelength-selective diffraction element 1F according to the sixth embodiment in which the phase plate is formed integrally, whereby the number of manufacturing steps can preferably be reduced and the thickness of this element can be made thin.

As described above, explanation has been made as to wavelength-selective diffraction element according to the first to seventh embodiments wherein a case of using a single wavelength-selective diffraction element, a case of laminating two wavelength-selective diffraction elements and a case of laminating two wavelength-selective diffraction elements and a phase plate have been described. However, it is possible to use a lamination of a single wavelength-selective diffraction element and a phase plate.

In these wavelength-selective diffraction elements, the diffraction efficiency can be changed by changing heights $d_1$, $d_2$ or the shape of a grating or gratings. Accordingly, the heights of the grating or gratings can be determined so as to obtain a desired efficiency when any of the diffraction elements is used for a 3-beam generating element or a holographic beam splitter.

Further, efficiency for a specified order of diffraction may be increased by modifying the concavo-convex portion of the wavelength-selective diffraction element to have a shape of grating having stair-like multisteps or a blazed diffraction grating. With respect to the angle of diffraction, the grating pitch may be determined so that a predetermined angle of diffraction can be obtained. Such techniques used for the conventional 3-beam generating element or holographic beam splitter can be utilized for the wavelength-selective diffraction element.

In combining two wavelength-selective diffraction elements, the case that they function as diffraction gratings with respect to either light of a wavelength $\lambda_1$ or the light of a wavelength $\lambda_2$ has been explained as described above. However, it is possible to use a combination which functions as a 3-beam generating diffraction grating or a holographic beam splitter with respect to the light of a wavelength $\lambda_1$, and which does not function as a diffraction grating with respect to the light of a wavelength $\lambda_2$, or vice versa. The wavelength diffracted selectively and the function as a diffraction grating can be combined depending on purposes.

In the above, description has been made that the heights $d_1$, $d_2$ of grating contribute to the diffraction efficiency and the grating pitch contributes to the angle of diffraction. A lower height of grating reduces the occurrence of round corners at edges of the grating, and can facilitate the formation of a fine pitch, and accordingly, it is preferable in controllability of shaping. Further, as the height of grating is lower, the manufacturing time for the element can be shortened, and it is advantageous in manufacturing steps.

As described above, the organic pigment having the absorption edge in a region having a shorter wavelength than the shorter wavelength $\lambda_1$ between two wavelengths $\lambda_1$ and $\lambda_2$ ($\lambda_1 < \lambda_2$) is contained in the concavo-convex member or the filling member, whereby the refractive index is increased due to an anomalous dispersion effect.

For instance, it is assumed that the filling member 13A shown in FIG. 1 contains an organic pigment wherein refractive indices of the diffraction grating 12A (comprising a concavo-convex member) and the filing member 13A with respect to light having a wavelength $\lambda_1$ are represented respectively by $n_{12A}(\lambda_1)$ and $n_{13A}(\lambda_1)$ and refractive indices of these members with respect to light having a wavelength $\lambda_2$ are represented respectively by $n_{12A}(\lambda_2)$ and $n_{13A}(\lambda_2)$. Then, $n_{12A}(\lambda_1)=n_{13A}(\lambda_1)$ with respect to the light having a wavelength $\lambda_1$ (FIG. 1(a)) and $n_{12A}(\lambda_2)>n_{13A}(\lambda_2)$ with respect to the light having a wavelength $\lambda_2$ (FIG. (b)). Accordingly, $n_{12A}(\lambda_2)-n_{13A}(\lambda_2)$ can be increased.

When the organic pigment is contained in the diffraction grating 12A, $n_{12A}(\lambda_1)=n_{13A}(\lambda_1)$ with respect to the wavelength $\lambda_1$ (FIG. 1(a)), and $n_{13A}(\lambda_2)>n_{12A}(\lambda_2)$ with respect to the wavelength $\lambda_2$ (FIG. 1(b)). Then, $n_{13A}(\lambda_2)-n_{12A}(\lambda_2)$ can be increased. Namely, the wavelength-selective diffraction element does not have the diffraction effect to the light having a wavelength $\lambda_1$, and have the diffraction effect to the light having a wavelength $\lambda_2$.

Further, it is assumed that the filling member 13B shown in FIG. 2 contains an organic pigment wherein refractive indices of the diffraction grating 12B and the filing member 13B with respect to light having a wavelength $\lambda_1$ are represented respectively by $n_{12B}(\lambda_1)$ and $n_{13B}(\lambda_1)$, and refractive indices of these members with respect to light having a wavelength $\lambda_2$ are represented respectively by $n_{12B}(\lambda_2)$ and $n_{13B}(\lambda_2)$. Then, $n_{13B}(\lambda_1)>n_{12B}(\lambda_1)$ with respect to the wavelength $\lambda_1$ (FIG. 2(a)), and accordingly, $n_{13B}(\lambda_1)-$ $n_{12B}(\lambda_1)$ can be increased. Further, $n_{12B}(\lambda_2)-n_{13B}(\lambda_2)$ with respect to the wavelength $\lambda_2$ (FIG. 2(b)). When the organic pigment is contained in the diffraction grating 12B, $n_{12B}(\lambda_1)$ >$n_{13B}(\lambda_1)$ with respect to the wavelength $\lambda_1$ (FIG. 2(a)). Accordingly, $n_{12B}(\lambda_1)-n_{13B}(\lambda_1)$ can be increased. Further, $n_{12B}(\lambda_2)=n_{13B}(\lambda_2)$ with respect to the wavelength $\lambda_2$ (FIG. 2(b)).

Namely, the wavelength-selective diffraction element has the diffraction effect to the light having a wavelength $\lambda_1$ and does not have the diffraction effect to the light having a wavelength $\lambda_2$.

As described above, when the organic pigment is used for the concavo-convex member or the filling member, refractive indices of two materials for these members with respect to light having either wavelength (for example, $\lambda_1$) can be made equal while the refractive index difference with respect to light of the other wavelength (for example $\lambda_2$) can be increased.

A film of the organic pigment may be formed by a vacuum evaporation method, or may be formed by using a composition prepared by mixing the organic pigment with a resin binder, polymerizable monomer, polymerization initiator, sensitizer, solvent, surfactant or the like followed by adjusting appropriately. In a case of using a composition, the composition may be coated on the transparent substrate followed by removing the solvent by heating and hardening for polymerization. Further, a heating treatment may be conducted after the hardening for polymerization if required.

The above-mentioned composition, when an organic pigment is contained in a resist allowing etching, it is preferable to form a grating having a desired shape by etching an unpolymerized portion after being hardened selectively. Further, when the resist is a photoresist, it is particularly preferable to form a grating because it can be formed directly by photolithography.

A red organic pigment is preferably used when the wavelength $\lambda_1$ and the wavelength $\lambda_2$ are respectively in a 650 nm wavelength band and a 790 nm wavelength band.

The red organic pigment does not show remarkable absorption in these wavelength bands, and can realize a high transmittance. On the other hand, absorption appears at a wavelength shorter than 650 nm. Absorption increases rapidly as the wavelength decreases, and the maximum absorption appears in the vicinity of 550 nm. Accordingly, a large value of the refractive index difference can be realized due to an anomalous dispersion effect in the 790 nm wavelength band and the 650 nm wavelength band.

An yellow organic pigment has its absorption edge near 500 nm in a shorter wavelength region in comparison with the red organic pigment. Accordingly, it does not have absorbability in a 790 nm wavelength band for a CD series and a 650 nm wavelength band for a DVD series, and it is an excellent material having a high transmittance. However, the region having a large dispersibility of wavelength shifts as a whole toward a shorter wavelength region in comparison with the red organic pigment, whereby only a smaller refractive index difference between the 650 nm wavelength band and the 790 nm wavelength band can be obtained.

As the red pigment, an organic pigment classified into a diketopyrrolopyrrole type, an anthraquinone type, a quinacridone type, a condensed azo type, a perylene type and so on can be used. These organic pigments may be used solely, or a mixture of two kinds or at least three kinds may be used. Among them, the diketopyrrolopyrrole type represented by Pigment Red 254 or the anthraquinone type represented by Pigment Red 177 is preferably used as a red organic pigment for this element because they have excellent durability.

A photoresist containing the red organic pigment is used for a color filter for a liquid crystal display, and some resists for commercially available color filters can be used as they are. Further, the concentration of the red organic pigment, resin binder, polymerization initiator for polymerizable monomers, sensitizer, solvent, surfactant and so on and the compound may be adjusted as the case requires.

In either case of the concavo-convex member for the grating or the filling member containing the red organic pigment, it is preferable that the light absorption characteristics after the formation (film formation) are adjusted as follows. The wavelength of the absorption edge is preferably in a range from 580 nm to 620 nm. The wavelength of the absorption edge is defined as follows. In a complex refractive index $n^*(\lambda)=n(\lambda)+1\cdot k(\lambda)$ (where $n(\lambda)$ in a real part represents the ordinary refractive index, $k(\lambda)$ in an imaginary part $i\cdot k(\lambda)$ represents the absorption coefficient and $\lambda$ represents the wavelength), when the wavelength is decreased, a wavelength $\lambda$ in which $k(\lambda)$ exceeds at the first time 0.01 in a wavelength of not more than 650 nm, is defined as the absorption edge.

The determination of $k(\lambda)$ of 0.01 is because it is near 0 and larger than a measurement error in a case that $k(\lambda)$ is increased from 0, and a tendency of increasing is clearly understandable. When the wavelength of the absorption edge is larger than 620 nm, the absorption loss (a reduction of the transmittance) becomes problematic. On the other hand, when it is smaller than 580 nm, it is difficult to obtain a larger wavelength dispersibility between the 650 nm wavelength band and the 790 nm wavelength band.

The minimum value of the absorption edge is preferably 0.85 $\lambda_1$ with respect to a shorter wavelength $\lambda_1$. The reason is as follows. 650 nm is generally used for the wavelength $\lambda_1$. However, 650 nm changes sometimes to about 675 nm due to a difference of the quality of semiconductor lasers or a temperature change. When a preferable minimum value of the absorption edge is 580 nm, it is 0.85 $\lambda_1$. On the other hand, when there is no difference of the quality in the semiconductor lasers, and the wavelength $\lambda_1$ is 650 nm in an ideal situation, it is 0.9 $\lambda_1$ at the time when the minimum value of the absorption edge is 580 nm. In considering circumstances that the difference of the quality of products, it is preferable that the minimum value of the absorption edge is 0.85 $\lambda_1$.

In order to obtain a larger wavelength dispersibility, it is necessary to increase rapidly the absorption coefficient with a decrease of the wavelength. Since the red organic pigment has the maximum absorption ability near a wavelength of 550 nm, the absorption coefficient should take a large value at this wavelength. Table 1 shows the absorption coefficient k of the organic pigment at 550 nm and the refractive index difference ($\Delta n$) between 650 nm and 790 nm used in Examples 1, 3, 4, 10 and 11 of the present invention.

TABLE 1

|  | K (550 nm) | $\Delta n$ |
|---|---|---|
| Example 1 | 0.21 | 0.028 |
| Example 3 | 0.19 | 0.024 |
| Example 4 | 0.09 | 0.035 |
| Example 10 | 0.05 | 0.014 |
| Example 11 | 0.05 | 0.015 |

A brochure for optical glass issued by SCHOTT describes flint glass as an optical glass having a large wavelength dispersibility. Refractive index differences $\Delta n$ of flint glass such as article names SF6 or SF58 are respectively 0.012 and 0.015. In comparison of these values, when k (550 nm)

in Table 1 using the red organic pigment is 0.05 or less, it is difficult to say that Δn takes a large value due to an anomalous dispersion effect. Accordingly, the absorption coefficient k at a wavelength of 550 nm is preferred to be larger than 0.05.

Further, other than the above-mentioned method that the grating is formed by etching a resist containing the organic pigment before it is hardened, the grating may be formed by using photolithography and etching treatments to the hardened member (the film or the vacuum-evaporated film), or a resist containing the organic pigment may be filled as a filling member in the concavo-convex portion of the grating formed on the substrate surface. As other film members, there are photo-curing resin, a thermosetting resin and so on. The description that the filling member is filled in the concavo-convex portion means that it is filled in at least a concave portion. Accordingly, it may be filled only in the concave portion. This meaning is applicable in the following sentences as well.

As the value Δn of a composition containing the above-mentioned red organic pigment is larger, the film thickness of the composition containing the red organic pigment can preferably be made thin. When Δn becomes larger, the refractive index at a wavelength of 650 nm becomes also high. Accordingly, the photo-curing resin or the thermosetting resin should have a high refractive index at a wavelength of 650 nm, specifically, the refractive index of 1.6 or more is preferably used.

As such photo-curing resin or thermosetting resin, JP-A-2000-309584 discloses a composition containing the compound expressed by the following formula 1. Since the composition has a high refractive index and a small wavelength dispersibility of the refractive index, it can preferably be used in the present invention. However, the present invention is not limited to such compound.

Formula 1

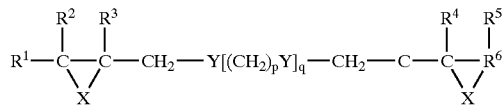

where $R^1$–$R^6$ represent respectively a hydrocarbon group having a carbon number of 1 to 10 or hydrogen, X represents S or O wherein the number of S is at least 50% to the total number of S and O constituting the 3-membered ring. Y represents O, S, Se or Te. p is an integer in a range of 0 to 6 and q is an integer in a range of 0 to 4.

In order to form a grating on a surface of a substrate, the substrate itself may be etched or may be formed by molding in a metal mold. Or, another optical material may be coated on a substrate, and then, a grating may be formed by etching the optical material or by molding in a metal mold. The organic pigment is contained in a film formed by the above-mentioned vacuum evaporation method.

In the following, explanation will be made as to a case that the wavelength-selective diffraction element is mounted on an optical head device.

(First Embodiment of the Optical Head Device)

Figure 8:
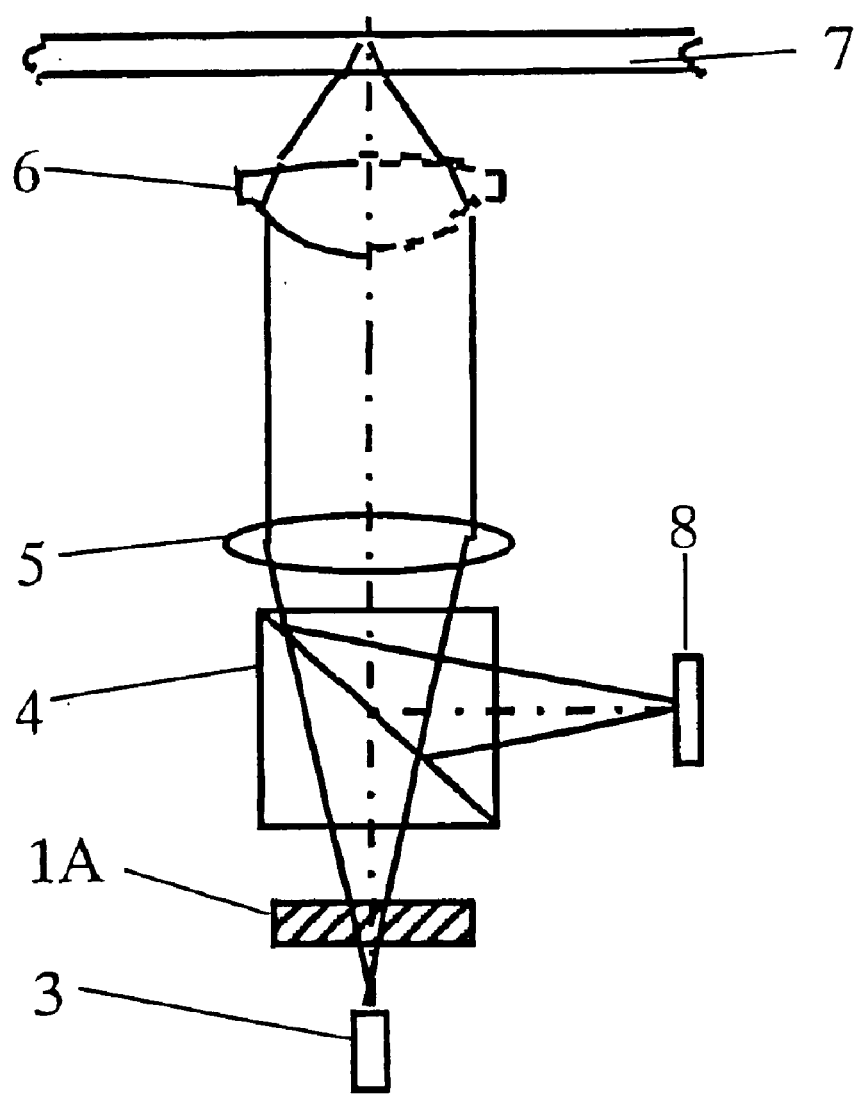
FIG. 8 is a diagrammatical side view showing a first embodiment of the optical head device of the present invention.
Figure 9:
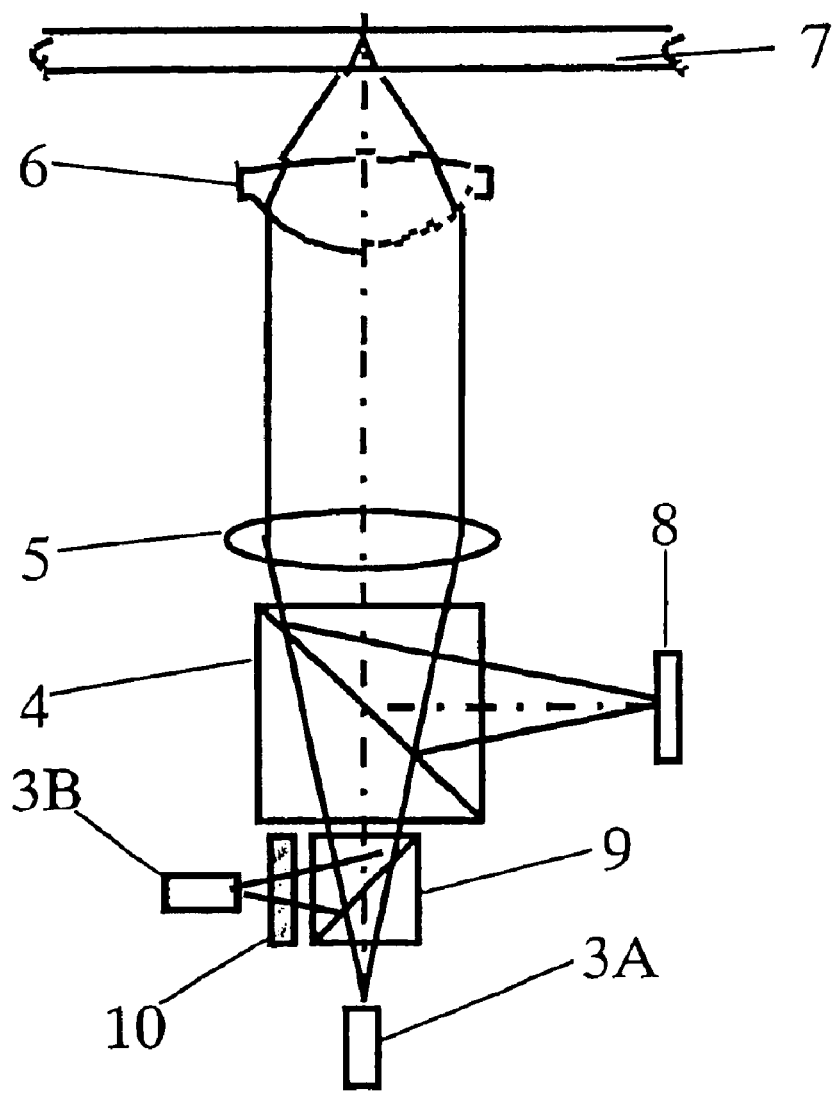
FIG. 9 is a diagrammatical side view showing an embodiment of a conventional optical head device.

FIG. 8 shows a first embodiment of the optical head device of the present invention in which the optical head device uses the wavelength-selective diffraction element 1A (FIG. 1) for generating 3 beams usable for a CD, as a wavelength-selective diffraction element. In the optical head device thus constructed, light having a wavelength $\lambda_1$ emitted from a two-wavelength semiconductor laser 3 (which is formed by unifying a semiconductor laser for emitting a laser light having a wavelength of $\lambda_1$ for a DVD series optical disk and a semiconductor laser for emitting a laser light having a wavelength $\lambda_2$ for a CD series optical disk) propagates linearly without being diffracted by the wavelength-selective diffraction element 1A and transmits through a beam splitter 4 to enter into a collimator lens 5 where the laser light is rendered to be a parallel beam.

Then, the parallel beam is focused on an information recording track of an optical disk 7 (for a DVD series) by means of an objective lens 6. The light reflected by the optical disk 7 transmits again through the objective lens 6 and the collimator lens 5, and reflected by the beam splitter 4 to be focused on the light receiving surface of a photodetector 8.

On the other hand, light having a wavelength $\lambda_2$ emitted from the two-wavelength semiconductor laser 3 enters into the wavelength-selective diffraction element 1A where a part of the entering light (e.g., 5% to 40%) is diffracted as ±1st-order diffraction lights. However, the main portion of the entering light including the ±1st-order diffraction lights transmit through the beam splitter 4 to enter into the collimator lens 5 where these lights are rendered to be parallel beams. Then, the parallel beams are focused on an information recording track of the optical disk 7 (for a CD series) by means of the optical lens 6 in a state of 3 beams comprising the 0th-order diffraction light and the ±1st-order diffraction lights. Then, the lights reflected by the optical disk 7 transmit again through the objective lens 6 and the collimator lens 5, and reflected by the beam splitter 4 so that the 0th-order diffraction light and the ±1st-order diffraction lights are focused on the light receiving surface of the photodetector 8.

As described above, when the optical head device mounting thereon the wavelength-selective diffraction element 1A of the present invention is used, the light having a wavelength $\lambda_1$ propagates linearly without being diffracted by the wavelength-selective diffraction element whereby there are no reduction of efficiency and no generation of stray light. Accordingly, with respect to the DVD series optical disk, it is possible to conduct stably the detection of tracking error signals by a retardation method using one beam, the detection of focusing error signals to the optical disk by an astimatic method and the detection of pit signals as recorded information, by using a photodetector (having four-divided light receiving surfaces) for the DVD series.

On the other hand, with respect to the CD series optical disk, the detection of focusing error signals by an astigmatic method and the detection of pit signals to the information recording surface of the optical disk, are carried out by using the same photodetector 8 having four-divided light receiving surfaces as the DVD series. Further, the detection of tracking error signals by a 3-beam method is carried out by receiving the ±1st-order diffraction lights in two other light receiving surfaces of the photodetector.

The above explanation concerns the case that the wavelength-selective diffraction element is used for generating 3 beams for the light having a wavelength $\lambda_2$ for a CD series. However, it may be used for a differential push-pull method for recording information. Further, the wavelength-selective diffraction element 1B may be used to generate 3 beams for the light having a wavelength $\lambda_1$ for a DVD series. Then, it is effective to detect more precisely a tracking error in comparison with the method of using one beam. Further, even in the application of the wavelength-selective diffraction element 1C or 1D for generating 3 beams independently, designing of the optimum diffraction grating can be made to optical disks of a CD series and a DVD series. Further, there is little possibility of generating loss of light quantity because light for either optical disk is diffracted by the diffraction grating of the other optical disk.

Further, in the optical head device for recording information in DC and DVD optical disks, the ratio of diffraction efficiency of the 1st-order diffraction to the 0th-order diffraction in a 3-beam diffraction grating is often made to be 15 or more. This ratio is in particular useful since the diffraction efficiency can be determined optionally.

The grating pitch of the wavelength-selective diffraction element can be determined appropriately depending on the optical system of an optical head device using the element and the method of detecting tracking error signals of the optical disk.

(Second Embodiment of the Optical Head Device)

Figure 10:
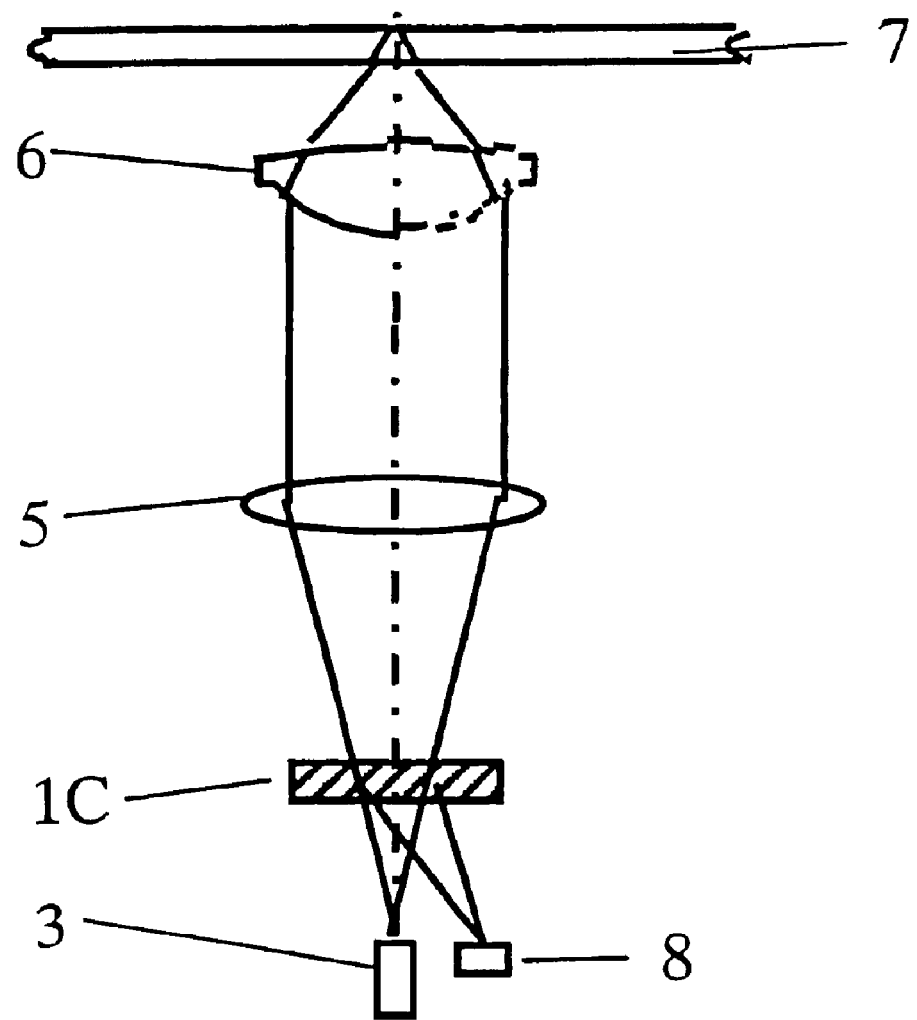
FIG. 10 is a diagrammatical side view showing a second embodiment of the optical head device of the present invention.
Figure 11:
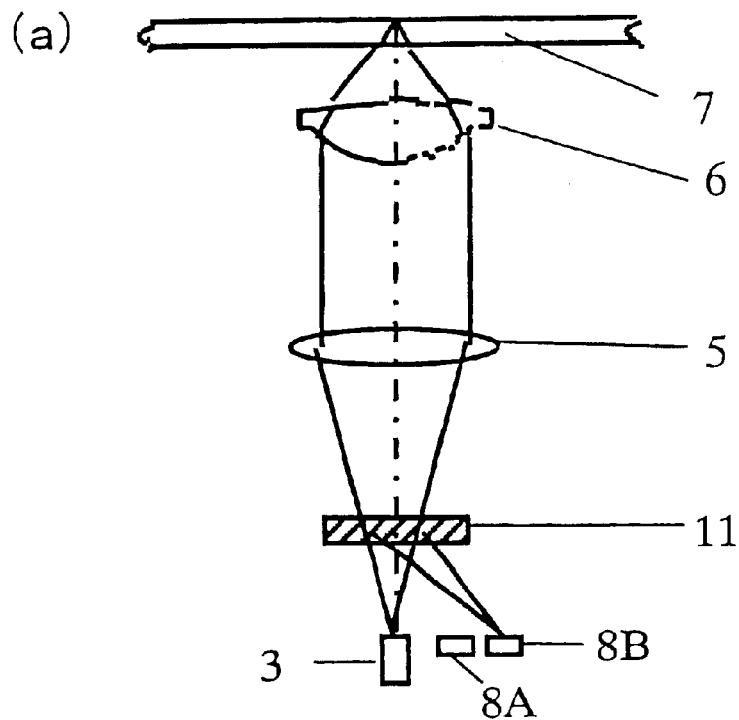
FIG. 11 is a diagram showing another embodiment of the conventional optical head device, wherein (a) is a diagrammatical side view showing a state that light of a wavelength $\lambda_1$ is diffracted, and (b) is a diagrammatical side view showing a state that light of a wavelength $\lambda_2$ is diffracted.
Figure 11:
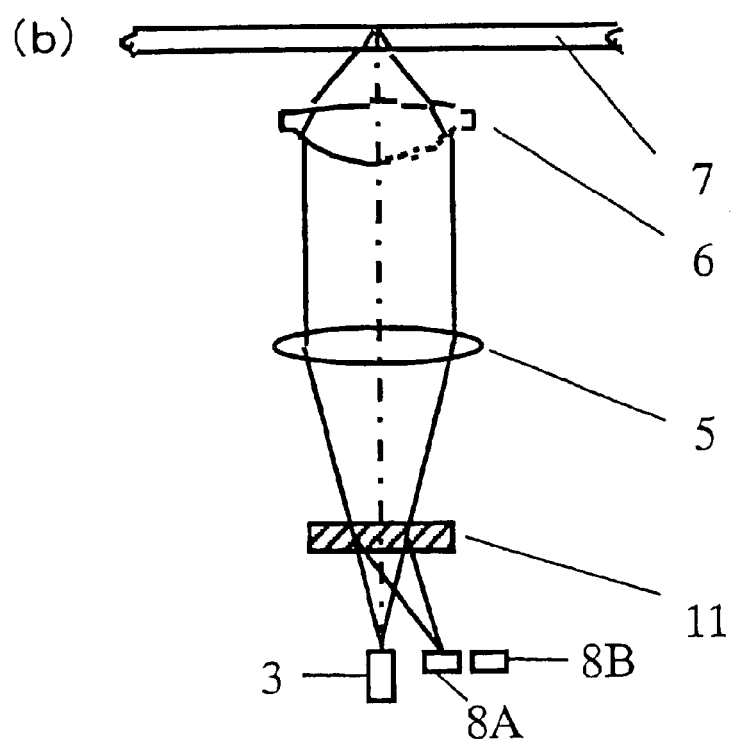

FIG. 10 shows a second embodiment of the optical head device of the present invention in which the optical head device uses the wavelength-selective diffraction element 1C as a holographic beam splitter. In the optical head device thus constructed, light having a wavelength $\lambda_1$ emitted from a two-wavelength semiconductor laser 3 for emitting light having wavelength $\lambda_1$ and wavelength $\lambda_2$ enters into the holographic splitter where about 70% of the entering light is transmitted, and it is rendered to be a parallel beam by a collimator lens 5. Then, the parallel beam is focused on an information recording track of an optical disk 7 (DVD series) by means of an objective lens 6. The light reflected by the optical disk 7 transmits again through the objective lens 6 and the collimator lens 5 to enter into the wavelength-selective holographic beam splitter. About 10% of light diffracted by the beam splitter is focused on the light receiving surface of a photodetector 8.

On the other hand, light having a wavelength $\lambda_2$ emitted from the two-wavelength semiconductor laser 3 enters into the holographic beam splitter. About 70% of the entering light transmits therethrough, and it is rendered to be a parallel beam by means of the collimator lens 5. Then, the parallel beam is focused on an information recording track of an optical disk 7 (CD series) by means of the objective lens 6. The light reflected by the optical disk 7 transmits again through the objective lens 6 and the collimator lens 5 to enter into the holographic splitter. About 10% of light diffracted by the beam splitter is focused on the light receiving surface of the same photodetector 8 as used for detecting the light having a wavelength $\lambda_1$.

In the optical head device mounting thereon the wavelength-selective diffraction element 1C of the present invention, it is possible to record and reproduce information of the optical disk usable for different wavelengths by using a single photodetector whereby miniaturization and high performance of the optical head device can be achieved. The grating pitch of the wavelength-selective diffraction element can be determined appropriately depending on the optical system of an optical head using the such element. The grating pitch of the wavelength-selective diffraction element is generally 5 μm or less. Accordingly, the diffraction element of the present invention in which the transmittance of light of a wavelength expected to transmit does not decrease even when the grating pitch is less than 5 μm, provides a high utilization efficiency of light. Further, for the DVD series optical disk, a construction that a wavelength-selective polarizing holographic beam splitter and the objective lens are driven integrally, may be used.

In the embodiment of the optical head device shown in FIG. 8, the beam splitter 4 is used, and the two-wavelength semiconductor laser 3 (a light source unit) and the photodetector 8 are disposed at separate positions. However, a wavelength-selective holographic beam splitter may be used instead of the beam splitter 4, and the light reflected by the optical disk is diffracted to be focused on a photodetector disposed near the semiconductor laser located in the two-wavelength semiconductor laser (a light source unit). In this case, the size of the optical head device can be reduced because the semiconductor laser and the photodetector are arranged in a single and same light source unit.

(Eighth Embodiment of the Wavelength-Selective Diffraction Element)

Figure 16:
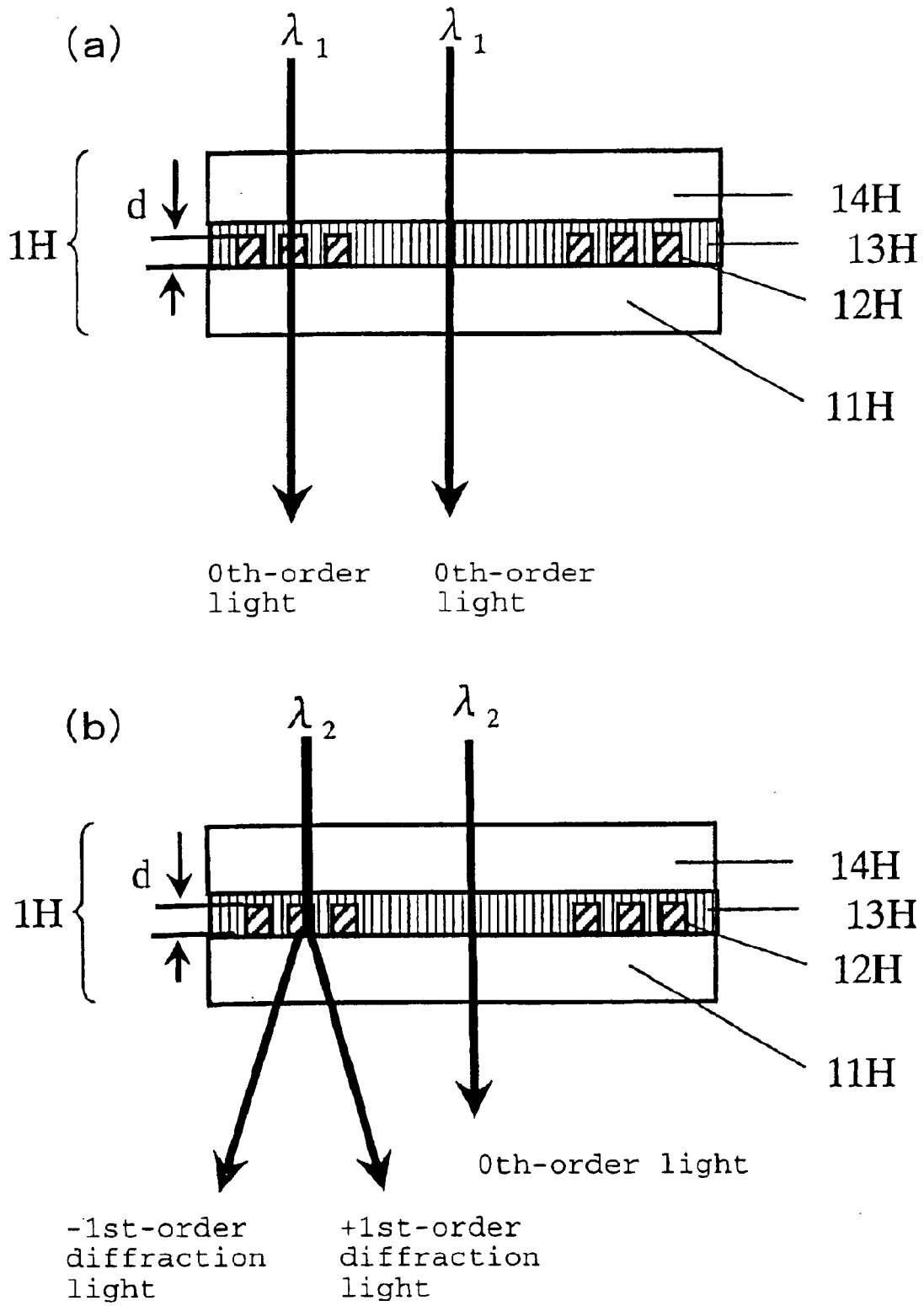
FIG. 16 is a diagram showing an eighth embodiment of the wavelength-selective diffraction element of the present invention, wherein (a) is a side view showing a state that light of a wavelength $\lambda_1$ enters, and (b) is a side view showing a state that light of a wavelength $\lambda_2$ is transmitted or diffracted.

The wavelength-selective diffraction element 1H of this embodiment shown in FIG. 16 comprises the wavelength-selective diffraction element used in the first embodiment provided that the diffraction grating is formed only in its peripheral portion. The wavelength-selective diffraction element 1H is a diffraction element provided with a transparent substrate 11H having a front surface on which a diffraction grating 12H having a concavo-convex portion for a grating (which is comprised of a concavo-convex member) is formed and a filling member 13H filled in the space. A transparent substrate 14H is formed thereon to protect the filling member 13H.

The refractive index of the diffraction grating 12H is equal to that of the filling member 13H with respect to light having a wavelength $\lambda_1$ and the refractive index of the diffraction grating 12H is different from that of the filling member 13H with respect to light having a wavelength $\lambda_2$. Accordingly, when the light having a wavelength $\lambda_1$ transmits through the diffraction grating 12H, the diffraction grating does not act as a diffraction grating and the light transmits linearly because refractive indices are equal. On the other hand, when the light having a wavelength $\lambda_2$ transmits therethrough, it acts as a diffraction grating because refractive indices are different. The major part of the light having a wavelength $\lambda_2$ can be diffracted by adjusting the height of the grating.

(Third Embodiment of the Optical Head Device)

Figure 17:
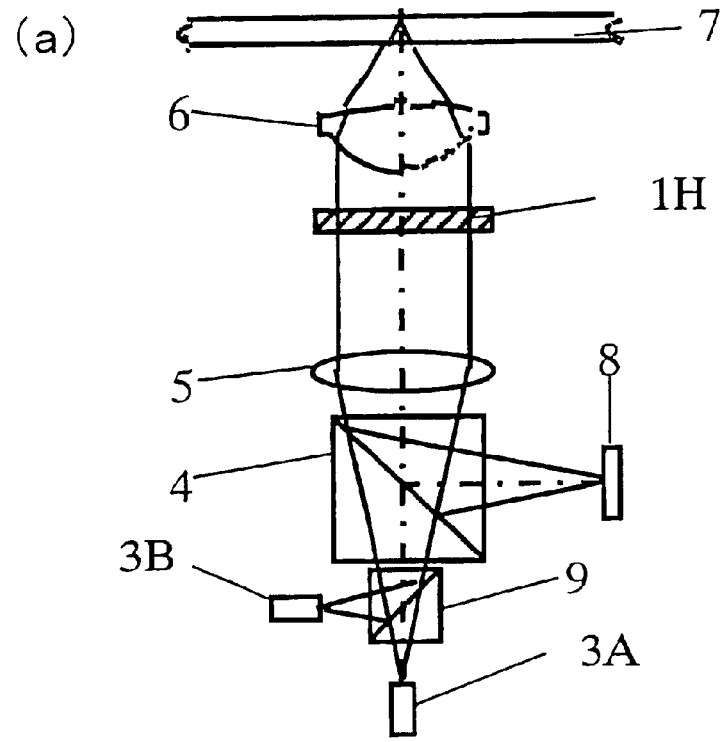
FIG. 17 is a diagram showing a third embodiment of the optical head device of the present invention, wherein (a) is a diagrammatical side view showing a state that recording and reproducing are carried out by using light of a wavelength $\lambda_1$, and (b) is a diagrammatical side view showing a state that recording and reproducing are carried out by using light of a wavelength $\lambda_2$.
Figure 17:
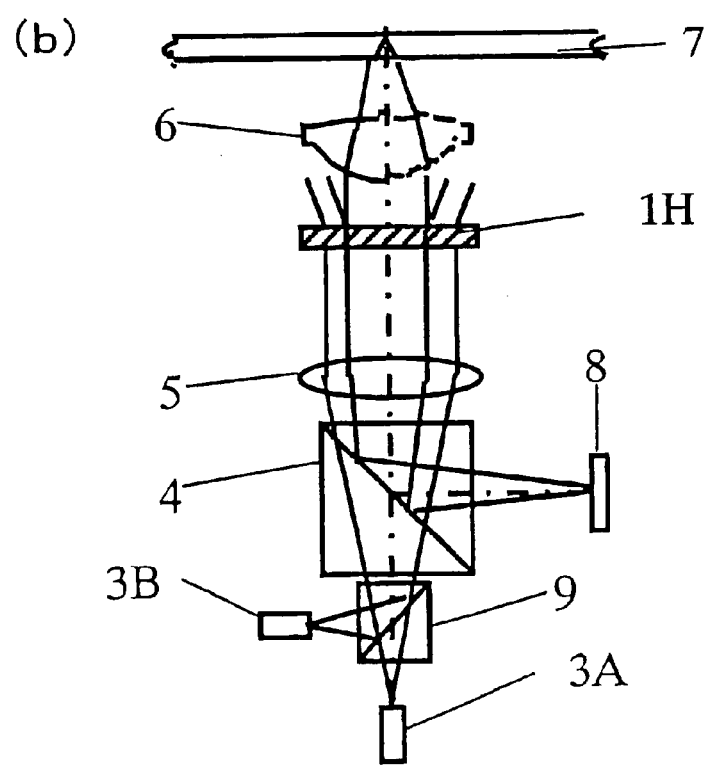

FIG. 17 shows a third embodiment of the optical head device of the present invention in which the wavelength-selective diffraction element 1H of the present invention is disposed as an aperture limiting element between a collimator lens and an objective lens. Two kinds of light emitted from semiconductor lasers 3A, 3B are synthesized on the same optical axis by a wavelength synthesizing prism 9; the synthesized light transmits through a beam splitter to enter into a collimator lens 5 to be formed into a parallel beam, and the parallel beam enters into the wavelength-selective diffraction element 1H as an aperture limiting element.

Light of $\lambda_1$ transmits through the aperture limiting element without being diffracted at its peripheral portion and central portion, and is focused on the information recording surface of a DVD series optical disk 7 by means of an objective lens 6 (FIG. 17(a)). Further, light of $\lambda_2$ is diffracted at the peripheral portion of the aperture limiting element, and only a portion of light transmitting through the central portion is focused, with a small numerical aperture, on the information recording surface of the optical disk (FIG. 17(b)). The light reflected by the optical disk transmits again through the objective lens 6, the aperture limiting element (wavelength-selective diffraction element 1H) and the collimator lens 5 to enter into the beam splitter 4. The light reflected by the beam splitter 4 propagates along the optical axis extending with an angle of 90° with respect to the optical axis of the coming route, and is focused on the light receiving surface of a photodetector 8. The photodetector 8 converts light signals to electrical signals.

Light of $\lambda_2$ diffracted by the aperture limiting element is focused on the information recording surface of the optical disk 7; propagates on the light path in the same manner as the signal lights after the reflection, and is focused on a portion deviated from the light receiving surface of the photodetector 8 although omitted in FIG. 17(b). Since the wavelength-selective diffraction element of the present invention is used in this example, it functions as an aperture only to the light having a wavelength $\lambda_2$. Further, since the transmittance of the wavelength $\lambda_1$ does not decrease even when the pitch of the diffraction grating is made small, the grating pitch can be made small to increase the diffraction angle of light of $\lambda_2$. Accordingly, it is easy to separate the light from a signal light, and a stray light does not reach the light receiving element for detecting signals, whereby stable recording and reproducing information can be carried out in comparison with a conventional aperture limiting element.

(Ninth Embodiment of the Wavelength-Selective Diffraction Element)

Figure 18:
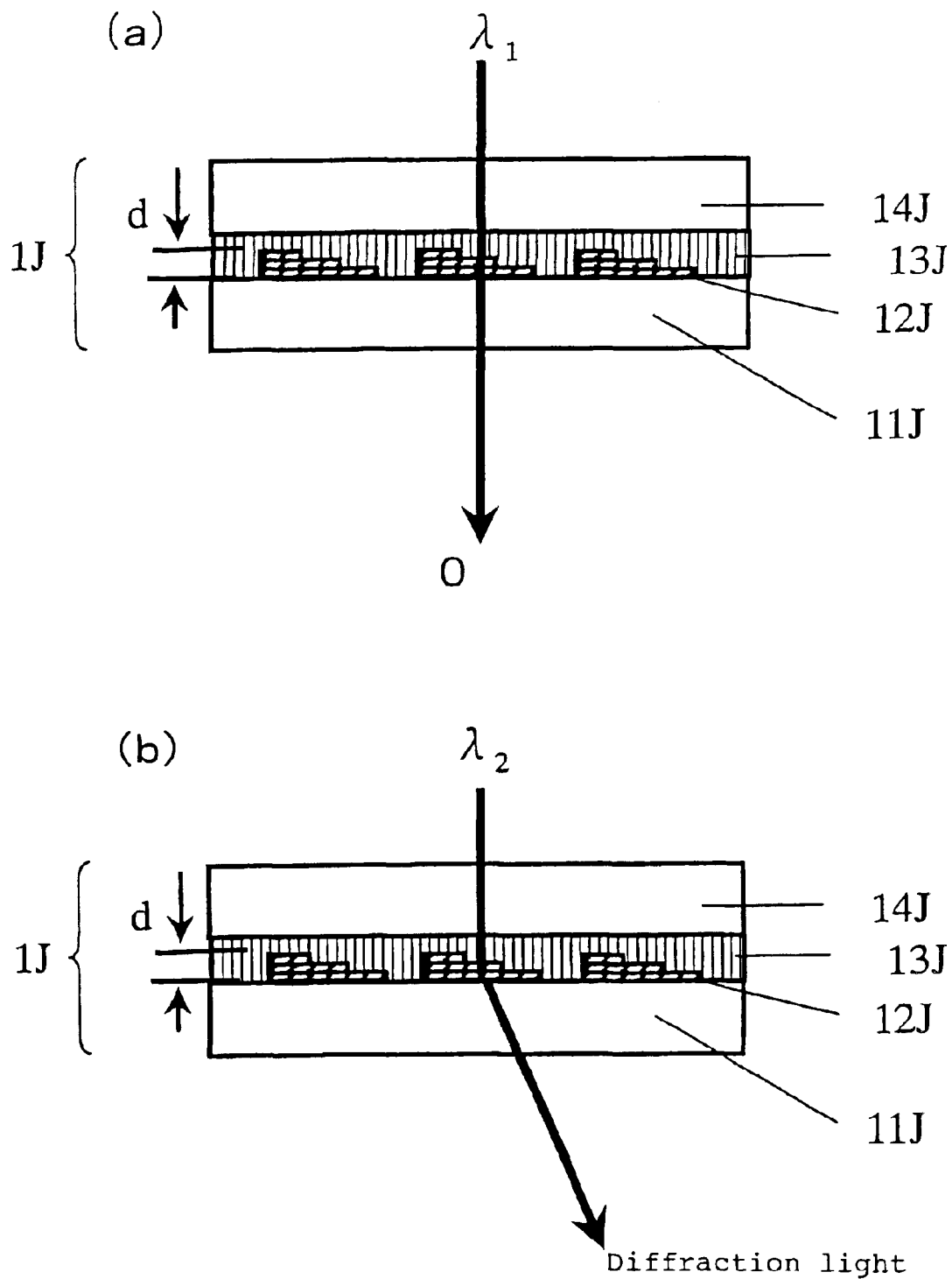
FIG. 18 is a diagram showing a ninth embodiment of the wavelength-selective diffraction element of the present invention, wherein (a) is a side view showing a state that light of a wavelength $\lambda_1$ enters, and (b) is a side view showing a state that light of a wavelength $\lambda_2$ is diffracted.

The wavelength-selective diffraction element 1J of this embodiment shown in FIG. 18 comprises the wavelength-selective diffraction element used in the first embodiment provided that the shape of the concavo-convex portion is a blazed shape or a pseudo blazed shape. The wavelength-selective diffraction element 1J (which is of a 4-level pseudo blazed shape in FIG. 18, however, it is not limited to have such shape) is a diffraction element provided with a transparent substrate 11J having a front surface on which a diffraction grating 12J having a concavo-convex portion acting as a grating (which is comprised of a concavo-convex member), a filling member 13J filled in the space and a transparent substrate 14J for protecting the filling member 13J. The refractive index of the diffraction grating 12J is equal to that of the filling member 13J with respect to light having a wavelength $\lambda_1$, and the refractive index of the diffraction grating 12J is different from that of the filling member 13J with respect to light having a wavelength $\lambda_2$.

Accordingly, when the light having a wavelength $\lambda_1$ transmits, the diffraction element does not effect as a diffraction grating and the light transmits linearly because refractive indices are equal. On the other hand, when the light having a wavelength $\lambda_2$ transmits, it effects as a diffraction grating because the refractive indices are different. Since the shape of the concavo-convex portion is a blazed shape or a pseudo blazed shape, the major portion of the light having a wavelength $\lambda_2$ can be diffracted with a specified order of diffraction by adjusting the height d of the grating.

(Fourth Embodiment of the Optical Head Device)

Figure 19:
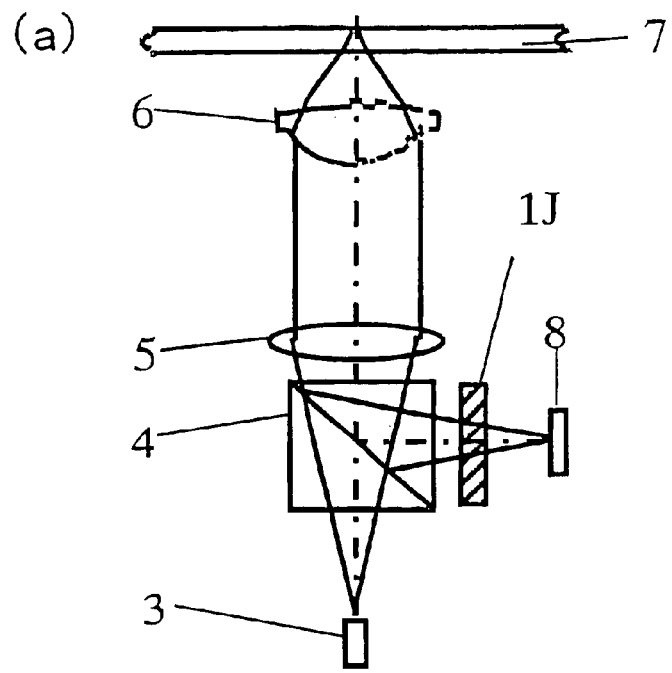
FIG. 19 is a diagram showing a fourth embodiment of the optical head device of the present invention, wherein (a) is a diagrammatical side view showing a state that recording and reproducing are carried out by using light of a wavelength $\lambda_1$, and (b) is a diagrammatical side view showing a state that recording and reproducing are carried out by light of a wavelength $\lambda_2$.
Figure 19:
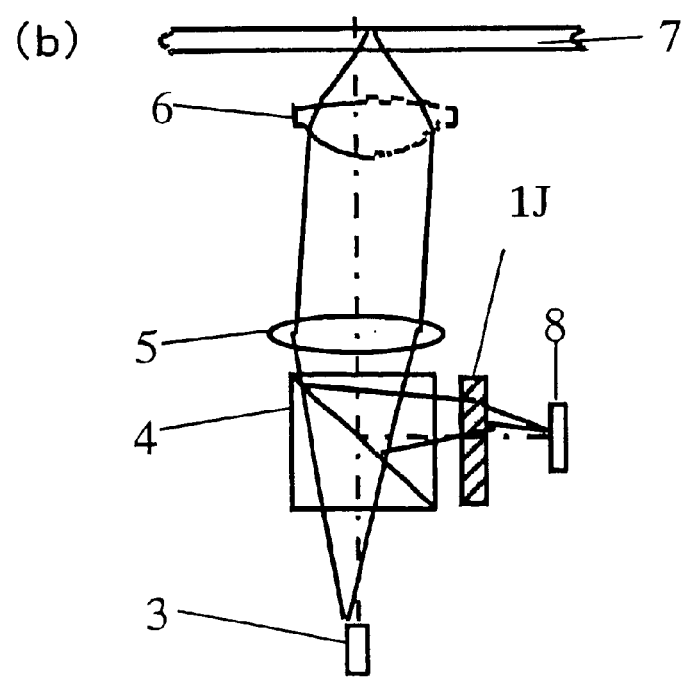

FIG. 19 shows a fourth embodiment of the optical head device of the present invention in which the wavelength-selective diffraction element 1J of the present invention is disposed as a wavelength-selective deflection element between a beam splitter 4 and a photodetector 8. An emission light having a wavelength $\lambda_1$ emitted from a light emitting point in a two-wavelength semiconductor laser 3 (FIG. 19(a)) and an emission light having a wavelength $\lambda_2$ emitted from another light emitting point (FIG. 19(b)) transmit through the beam splitter 4 to enter into a collimator lens 5 where emission lights are transformed into parallel beams. The parallel beams are focused on the information recording surface of an optical disk 7 by means of an objective lens 6.

The lights reflected from the optical disk 7 transmit again through the objective lens 6 and the collimator lens 5 to enter into the beam splitter 4. The lights reflected by the beam splitter 4 propagate along the optical axis extending with an angle of 90° with respect to the optical axis of coming route to enter into the wavelength-selective diffraction element 1J as a wavelength-selective deflection element. The light having a wavelength $\lambda_1$ enters into the wavelength-selective defection element and transmits therethrough without being deflected by the wavelength-selective deflection element and the light is focused on the light receiving surface of the photodetector 8 (FIG. 19(a)).

On the other hand, the light having a wavelength $\lambda_2$ entering into the wavelength-selective deflection element is defected by the wavelength-selective diffraction element 1J as a wavelength-selective deflection element, and then, the light is focused on the light receiving surface of the same photodetector as the photodetector 8 for the light having a wavelength $\lambda_1$ (FIG. 19(b)). Since the wavelength-selective diffraction element of the present invention is used in this embodiment, the light having a wavelength $\lambda_1$ can be transmitted at a high transmittance, and the light having a wavelength $\lambda_2$ can be diffracted, i.e., deflected. Accordingly, stable recording and reproducing of information can be carried out in comparison with the case of using a conventional wavelength-selective deflection element.

In the following, several examples are described.

EXAMPLE 1

A red-colored resist CFRP-RH1019 including an organic pigment (a red pigment) (manufactured by Tokyo Ohka Kogyo Co., Ltd.) was used as a concavo-convex member. The red-colored resist was coated uniformly on a glass substrate in a thickness of 6.0 μm by a spin coating method, and the coating was kept at 100° C. for 5 min. Then, a photomask was disposed on the glass substrate at a side of the red-colored resist followed by exposing to U.V. rays. Then, development was conducted in an alkaline solution, and it was kept at 220° C. for 60 min.

Thus, the diffraction grating 12A as shown in FIG. 1 was prepared wherein the grating pitch was 60 μm and the grating height was 6.0 μm. The concavo-convex member had its absorption edge at a wavelength of 590 nm, and the absorption coefficient k at a wavelength of 550 nm was 0.21. Further, the refractive index was 1.654 at a wavelength of 650 nm, 1.626 at a wavelength of 790 nm, and the refractive index difference with respective to the above-mentioned two wavelengths was 0.028.

Then, a photopolymer having a refractive index (after polymerization) of 1.656 at a wavelength of 650 nm and 1.646 at a wavelength of 790 nm and a refractive index difference of 0.010 was filled as a filling member in a state of monomer in the concavo-convex portion of the grating. Another glass substrate was laminated so as to sandwich the diffraction grating and the photopolymer. Then, U.V. rays were irradiated to the monomer to polymerize it to thereby prepare a wavelength-selective diffraction element.

A semiconductor laser light having a wavelength of 790 nm was irradiated to the thus prepared element. As a result, the transmittance of the 0th-order diffraction light was 74%, and diffraction efficiencies of a +1st-order diffraction light and a −1st-order diffraction light were 10% respectively. Further, a semiconductor laser light having a wavelength of 650 nm was irradiated to the element. As a result, the transmittance of the 0th-order diffraction light was 92%, and a +1st-order diffraction light, a −1st-order diffraction light and higher-order diffraction lights were 0.5% or less respectively. The diffraction element exhibited a wavelength-selective diffraction effect with respect to the light having two wavelengths.

EXAMPLE 2

The same red-colored resist as used in Example 1 was coated as a concavo-convex member uniformly on a glass substrate by a spin coating method to prepare a red-colored resist film having a thickness of 6.0 μm under the same conditions of temperature and time as in Example 1. On the thus formed film, a $SiO_2$ film having a thickness of 60 nm was formed by a sputtering method, and a photoresist was coated on the $SiO_2$ film by a spin coating method.

Then, a photomask was disposed on the glass substrate at a side of the $SiO_2$ film followed by exposing to U.V. rays, and dry etching was conducted. Thus, the diffraction grating 12A as shown in FIG. 1 was prepared wherein the grating pitch was 4 μm and the grating height was 6.0 μm. Further, the same photopolymer as used in Example 1 was filled as a filling member in the concavo-convex portion of the grating in a state of monomer, and another glass substrate was laminated so as to sandwich the diffraction grating and the photopolymer. Then, U.V. rays were irradiated to the entire surface of the glass substrate to polymerize monomers to thereby prepare a wavelength-selective diffraction element.

A semiconductor laser light having a wavelength of 790 nm was irradiated to the thus prepared wavelength-selective diffraction element. As a result, the transmittance of the 0th-order diffraction light was 74%, and diffraction efficiencies of a +1st-order diffraction light and a −1st-order diffraction light were 10% respectively. Further, a semiconductor laser light having a wavelength of 650 nm was irradiated. As a result, the transmittance of the 0th-order diffraction light was 92%, and diffraction efficiencies of +1st-order diffraction light, a −1st-order diffraction light and higher-order diffraction lights were 0.5% or less respectively. The diffraction element of this embodiment exhibited a wavelength-selective diffraction effect with respect to the above-mentioned lights of two wavelengths.

EXAMPLE 3

A red-colored resist A-0011 (manufactured by Dai Nippon Ink & Chemicals, Inc.) containing an organic pigment (a red pigment) was used. The red-colored resist was coated, as a concavo-convex member, uniformly on a glass substrate by a spin coating method. Then, the coated glass substrate was kept at 100° C. for 5 min in the same manner as in Example 1. U.V. rays were irradiated to the entire surface of the glass substrate, and the glass substrate was kept at 220° C. for 60 min. to prepare a film having a thickness of 7.0 μm. On the thus formed film, a $SiO_2$ film was formed by a sputtering method in the same manner as Example 2, and a photoresist coated on the $SiO_2$ film was exposed to U.V. rays followed by dry etching. Thus, the diffraction grating 12A as shown in FIG. 1 was prepared wherein the grating pitch was 4 μm and the grating height was 7.0 μm.

The concavo-convex member had its absorption edge at a wavelength of 580 nm, and the absorption coefficient k at a wavelength of 550 nm was 0.19. The refractive index was 1.631 at a wavelength of 650 nm and 1.607 at a wavelength of 790 nm, and the refractive index difference with respect to the above-mentioned two wavelengths was 0.024.

Then, a photopolymer having a refractive index, after the polymerization, of 1.632 at a wavelength of 650 nm and 1.624 at a wavelength of 790 nm and a refractive index difference with respect to both wavelengths of 0.008 was filled as a filling member in a state of monomer in the concavo-convex portion of the grating. Another glass substrate was laminated so as to sandwich the diffraction grating and the photopolymer. Then, U.V. rays were irradiated to the entire surface of the glass substrate to polymerize monomers to thereby prepare a wavelength-selective diffraction element.

As semiconductor laser having a wavelength of 790 nm was irradiated to the thus prepared element. As a result, the transmittance of the 0th-order diffraction light was 74% and diffraction efficiencies of a +1st-order diffraction light and a −1st-order diffraction light were 10% respectively. Further, a semiconductor laser light having a wavelength of 650 nm was irradiated to the element. As a result, the transmittance of the 0th-order diffraction light was 92% and diffraction efficiencies of a +1st-order diffraction light, a −1st-order diffraction light and higher-order diffraction lights were 0.5% or less respectively. The diffraction element exhibited a wavelength-selective diffraction effect with respect to the lights having two wavelengths.

EXAMPLE 4

A mixture was prepared by mixing 73% (based on mass, same as below) of CF Red AGR-01 (manufactured by MIKUNI SHIKISO KABUSHIKI KAISHA) being a pigment-containing liquid comprising 14.8% of Pigment Red as a red organic pigment, 22% of pentaerythritol tetraacrylate (KAYARAD-DPHA, manufactured by Nippon Kayaku Co., Ltd.) and 5% of propylene glycol-1-monomethyl ether-2-acetate. IRGACURE 907 (manufactured by Ciba Specialty Chemicals Inc.) as a photopolymerization initiator was mixed in an amount of 0.7% to the total amount of the mixture to prepare a composition.

This composition was coated as a concavo-convex member uniformly on a glass substrate by a spin coating method, and it was kept at 100° C. for 3 min. Then, U.V. rays were irradiated to the entire surface of the composition, and it was kept at 200° C. for 60 min to prepare a film having a thickness of 5.5 μm. A $SiO_2$ film having a thickness of 60 nm was formed on the thus prepared film by a sputtering method, and a photoresist was coated on the $SiO_2$ film by a spin coating method. Then, a photomask was placed on the glass substrate at a side of the $SiO_2$ film, and U.V. rays were exposed to the film, and then, dry etching was conducted. Thus, the diffraction grating 12A as shown in FIG. 1 was prepared wherein the grating pitch was 4 μm and the grating height was 5.5 μm.

The concavo-convex member had its absorption edge at a wavelength of 600 nm, and the absorption coefficient k at 550 nm was 0.10. The refractive index was 1.636 at a wavelength of 650 nm and 1.601 at a wavelength of 790 nm, and the refractive index difference with respect to the above two wavelengths was 0.035.

Then, a photopolymer having a refractive index (after the polymerization) of 1.638 at a wavelength 650 nm and 1.624 at a wavelength of 790 nm and a refractive index difference with respect to the two wavelengths of 0.014 was filled as a filling member in the concavo-convex portion of the grating in a state of monomer. Another glass substrate was laminated so as to sandwich the diffraction grating and the photopolymer. Then, U.V. rays were irradiated to the lamination to polymerize monomers to thereby prepare a wavelength-selective diffraction element.

A semiconductor laser light having a wavelength of 790 nm was irradiated to the thus prepared element. As a result, the transmittance of the 0th-order diffraction light was 74%, and diffraction efficiencies of a +1st-order diffraction light and a −1st-order diffraction light were 10% respectively. Further, a semiconductor laser light having a wavelength of 650 nm was irradiated. As a result, the transmittance of the 0th-order diffraction light was 92% and diffraction efficiencies of +1st-order diffraction light, a −1st-order diffraction light and higher-order diffraction lights were 0.5% or less respectively. The diffraction element exhibited a wavelength-selective diffraction effect with respect to the above two wavelengths.

EXAMPLE 5

The same red-colored resist as used in Example 1 was coated uniformly on a glass substrate by a spin coating method, and same operations of temperature, time, etc. as Example 1 were conducted to thereby prepare a film of red-colored resist having a thickness of 6.0 μm. A $SiO_2$ film was formed on the thus prepared film by a sputtering method, and dry etching was conducted in the same manner as Example 2. Thus, the diffraction grating 12A as shown in FIG. 1 was prepared wherein the grating pitch was 4 μm and the grating height was 4.0 μm.

Then, a photopolymer having a refractive index (after the polymerization) of 1.632 at a wavelength of 650 nm and 1.624 at a wavelength of 790 nm, and a refractive index difference with respect to the two wavelengths of 0.008, which was used in Example 3, was filled as a filling member in the concavo-convex portion of the grating in a state of monomer. Another glass substrate was laminated so as to sandwich the diffraction grating and the photopolymer. Then, U.V. rays were irradiated to the entire surface of the glass substrate to polymerize monomers to thereby prepare a wavelength-selective diffraction element.

A semiconductor laser light having a wavelength of 650 nm was irradiated to the thus prepared element. As a result, the transmittance of the 0th-order diffraction light was 72% and diffraction efficiencies of a +1st-order diffraction light and a −1st-order diffraction light were 10% respectively. Further, a semiconductor laser light having a wavelength of 790 nm was irradiated. As a result, the transmittance of the 0th-order diffraction light was 95%, and diffraction efficiencies of a +1st-order diffraction light, a −1st-order diffraction light and higher-order diffraction lights were 0.5% or less respectively. The diffraction element exhibited a wavelength-selective diffraction effect to the above-mentioned light having two wavelengths and exhibited a different wavelength selectivity from the element of Example 2.

EXAMPLE 6

The same red-colored resist as used in Example 1 was coated uniformly on a glass substrate by a spin coating method, and same conditions of temperature, time, etc. as Example 1 were applied to thereby prepare a film of red-colored resist having a thickness of 6.0 μm. A $SiO_2$ film was formed on the thus prepared film by a sputtering method and dry etching was conducted in the same manner as Example 2. Thus, the diffraction grating 12A as shown in FIG. 1 was prepared wherein the grating pitch was 4 μm and the grating height was 4.0 μm.

Then, a photopolymer having a refractive index (after the polymerization) of 1.632 at a wavelength of 650 nm and 1.624 at a wavelength of 790 nm, and a refractive index difference with respect to the two wavelengths of 0.008 was filled as a filling member in the concavo-convex portion of the grating in a state of monomer. The element prepared in Example 2 was laminated thereon, and U.V. rays were irradiated to the entire surface of the glass substrate to polymerize monomers to thereby prepare a wavelength-selective diffraction element.

A semiconductor laser light having a wavelength of 650 nm was irradiated to the thus prepared element. As a result, the transmittance of the 0th-order diffraction light was 70%, and diffraction efficiencies of a +1st-order diffraction light and a −1st-order diffraction light were 10% respectively. Further, a semiconductor laser having a wavelength of 790 nm was irradiated to the element. As a result, the transmittance of the 0th-order diffraction light was 72%, and diffraction efficiencies of a +1st-order diffraction light and a −1st-order diffraction light were 10% respectively. Further, diffraction efficiencies of the second-order or higher-order diffraction lights with respect to light having any wavelength were 0.5% or less.

EXAMPLE 7

In the optical head device for two wavelengths of this Example, the wavelength-selective diffraction element prepared in Example 1 is disposed between a two-wavelength semiconductor laser 3 and a beam splitter 4, like the wavelength-selective diffraction element 1A shown in FIG. 8. The use of the wavelength-selective diffraction element of the present invention allowed the linear propagation of light of a wavelength $\lambda_1$ without being diffracted and the generation of 3 beams for detecting tracking error with respect to light of a wavelength $\lambda_2$. Further, it was possible to record and reproduce stably information with good S/N and a smaller number of constituent elements.

EXAMPLE 8

In the optical head device for two wavelengths of this Example, the wavelength-selective diffraction element prepared in Example 6 is disposed between a two-wavelength semiconductor laser 3 and a collimator lens 5, like the wavelength-selective diffraction element 1C shown in FIG. 10. The use of the wavelength-selective diffraction element of the present invention allowed designing of a holographic beam splitter independent from light of a wavelength $\lambda_1$ and light of a wavelength $\lambda_2$, and focusing with good efficiency either light of a wavelength $\lambda_1$ or a wavelength $\lambda_2$ on the light receiving surface of a single and same photodetector 8. Further, it was possible to record and reproduce stably information with good S/N and a smaller number of constituent elements.

EXAMPLE 9 (COMPARATIVE EXAMPLE)

An yellow-colored resist CY-S673A (manufactured by Fuji Film Olin Co., Ltd.) containing an organic pigment (yellow pigment) was used as a concavo-convex member. This organic pigment was coated uniformly on a glass substrate by a spin coating method, and it was kept at 100° C. for 5 min. Then, U.V. rays were irradiated to the entire surface of the glass substrate, and it was kept at 220° C. for 60 min to thereby form a film having a thickness of 6.0 μm. This film had its absorption edge at a wavelength of 480 nm; the refractive index was 1.590 at a wavelength of 650 nm and 1.576 at a wavelength of 790 nm, and the refractive index difference with respect to the above-mentioned two wavelengths was 0.014.

On the other hand, a red-colored resist CFRP-RH1019 (manufactured by Tokyo Ohka Kogyo Co., Ltd.) containing a red pigment having its absorption edge at a wavelength of 590 nm was used to form a film in the same manner as above. The refractive index difference with respect to the above-mentioned two wavelengths was 0.028 which was twice as much as the value of the yellow-colored resist.

By using the above-mentioned yellow-colored resist, a wavelength-selective diffraction element was prepared in the same manner as Example 1. A semiconductor laser light having a wavelength of 790 nm was irradiated to the element. As a result, the transmittance of the 0th-order diffraction light was 90%, and diffraction efficiencies of a +1st-order diffraction light and a −1st-order diffraction light were 3% respectively. The diffraction efficiency was ⅓ of the value obtained when the red-colored resist CFRP-RH1019 was used.

EXAMPLE 10 (COMPARATIVE EXAMPLE)

A red-colored resist CFRP-RP103 (manufactured by Tokyo Ohka Kogyo Co., Ltd.) was used as a concavo-convex member. This resist was coating uniformly on a glass substrate by a spin coating method, and it was kept at 90° C. for 2 min. Then, U.V. rays were irradiated to the entire surface, and it was kept at 190° C. for 30 min to prepare a film having a thickness of 6.0 $\mu$m. The wavelength at the absorption edge of the concavo-convex member was 580 nm, and the absorption coefficient k at a wavelength of 550 nm was 0.05. The refractive index was 1.548 at a wavelength of 650 nm and 1.534 at a wavelength of 790 nm, and the refractive index difference with respect to the above-mentioned two wavelengths was 0.014.

On the other hand, a red-colored resist CFRP-RH1019 (manufactured by Tokyo Ohka Kogyo Co., Ltd.) containing a red pigment having its absorption edge at a wavelength of 590 nm was used to form a film in the same manner as above. The refractive index difference with respect to the above-mentioned two wavelengths of the thus formed film was 0.028 which was twice as much as the value of the red-colored resist CFRP-RP103.

The above-mentioned red-colored resist CFRP-RP103 was used to prepare a wavelength-selective diffraction element in the same manner as Example 1. A semiconductor laser light having a wavelength of 790 nm was irradiated to the element. As a result, the transmittance of the 0th-order diffraction light was 90%, and diffraction efficiencies of a +1st-order diffraction light and a −1st-order diffraction light were 3% respectively. The diffraction efficiency was ⅓ of the value obtained by the red-colored resist CFRP-RH1019.

EXAMPLE 11 (COMPARATIVE EXAMPLE)

A mixture was prepared by mixing 73% of CF Red AGR-02 (manufactured by MIKUNI SHIKISO KABUSHIKI KAISHA) being a pigment-containing liquid comprising 14.7% of Pigment Red 209 as a red organic pigment, 22% of pentaerythritol tetraacrylate (KAYARAD-DPHA, manufactured by Nippon Kayaku Co., Ltd.) and 5% propylene glycol-1-monmethylether-2-acetate. IRGACURE 907 (manufactured by Ciba Specialty Chemicals Inc.) as a photopolymerization initiator was mixed in an amount of 0.7% to the total amount of the mixture to prepare a composition.

This composition was used as a concavo-convex member and was coated uniformly on a glass substrate by a spin coating method, and it was kept at 100° C. for 3 min. Then, U.V. rays were irradiated to the entire surface of the composition, and it was kept at 200° C. for 60 min to prepare a film having a thickness of 6.0 $\mu$m. The wavelength at the absorption edge of the concavo-convex member was 570 nm, and the absorption coefficient k at a wavelength of 550 nm was 0.05. The refractive index was 1.605 at a wavelength of 650 nm and 1.590 at a wavelength of 790 nm, and the refractive index difference with respect to the above-mentioned two wavelengths was 0.015.

On the other hand, a film was formed by using a red-colored resist CFRP-RH1019 (manufactured by Tokyo Ohka Kogyo Co., Ltd.) containing a red pigment having its absorption edge at a wavelength of 590 nm, in the same manner as above. The refractive index difference of the thus formed film with respect to the above-mentioned two wavelengths was 0.028, which was about twice as much as the value of the composition in this Example.

By using the composition of this Example was used to prepare a wavelength-selective diffraction element like Example 1. A semiconductor laser light having a wavelength of 790 nm was irradiated to the element. As a result, the transmittance of the 0th-order diffraction light was 90%, and diffraction efficiencies of a +1st-order diffraction light and a −1st-order diffraction light were 3% respectively. The diffraction efficiency was ⅓ of the value obtained when the red-colored resist CFRP-RH1019 was used.

EXAMPLE 12

A mixture was prepared by mixing 85% of CF Red EX-2739 (manufactured by MIKUNI SHIKISO KABUSHIKI KAISHA) being a pigment-containing liquid comprising 14.7% of Pigment Red 254 as a red organic pigment, 12% of pentaerythritol tetraacrylate (KAYARAD-DPHA, manufactured by Nippon Kayaku Co., Ltd.) and 3% of propylene glycol-1-momethylether-2-acetate. IRGA-CURE 907 (manufactured by Ciba Specialty Chemicals Inc) as a photopolymerization initiator was mixed in an amount of 0.2% to the total amount of the mixture to prepare a composition.

This composition was coated as a concavo-convex member uniformly on a glass substrate by a spin coating method, and it was kept at 100° C. for 3 min. Then, U.V rays were irradiated to the entire surface of the composition, and it was kept at 200° C. for 60 min to prepare a film having a thickness of 4.9 $\mu$m. A SiO$_2$ film having a thickness of 60 nm was formed on the thus prepared film by a sputtering method, and a photoresist was coated on the SiO$_2$ film by a spin coating method. Then, a photomask was placed on the glass substrate at a side of the SiO$_2$ film, and U.V. rays were exposed to the film followed by dry etching. Thus, the diffraction grating 12A as shown in FIG. 1 was prepared wherein the grating pitch was 4 $\mu$m and the grating height was 4.9 $\mu$m.

The wavelength at the absorption edge of the concavo-convex member was 590 nm, and the absorption coefficient k at 550 nm was 0.28. The refractive index was 1.703 at a wavelength of 650 nm and 1.656 at a wavelength of 790 nm, and the refractive index difference with respect to the above-mentioned two wavelengths was 0.047.

Then, 0.1% of tetrabutylammonium bromide was added to bis($\beta$-epithiopropyl)sulfide to a compound expressed by formula 2, and a mixture was stirred for 5 min. The mixture was filled as a filling member in the concavo-convex portion of the grating in a state of monomer, and another glass substrate was laminated so as to sandwich the diffraction grating and the filling member. Thereafter, the lamination was heated at 100° C. for 4 hr to cure the filling member. The refractive index of the filling member after curing was 1.704 at a wavelength of 650 nm and 1.697 at 790 nm.

A semiconductor laser light having a wavelength of 790 nm was irradiated to the thus prepared element. As a result, the transmittance of the 0th-order diffraction light was 73% and diffraction efficiencies of a +1st-order diffraction light and a −1st-order diffraction light were 9% respectively. Further, a semiconductor laser light having a wavelength of 650 nm was irradiated. As a result, the transmittance of the 0th-order diffraction light was 95% and diffraction efficiencies of a +1st-order diffraction light, a −1st-order diffraction light and higher-order diffraction lights were 0.5% or less respectively. This element exhibited a wavelength-selective diffraction effect with respect to the above-mentioned two wavelengths.

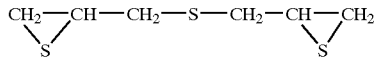

Formula 2

EXAMPLE 13

A mixture was prepared by mixing 91% of CF Red EX-2739 (manufactured by MIKUNI SHIKISO KABUSHIKI KAISHA) being a pigment-containing liquid comprising 14.7% of Pigment Red 254 as a red organic pigment, 7% of pentaerythritol tetraacrylate (KAYARAD-DPHA, manufactured by Nippon Kayaku Co., Ltd.) and 2% of propylene-glycol-1-monmethylether-2-acetate. Further, IRGACURE 907 (manufactured by Ciba Specialty Chemicals Inc.) as a photopolymerization initiator was mixed in an amount of 0.2% to the total amount of the mixture to prepare a composition.

This composition was coated as a concavo-convex member uniformly on a glass substrate by a spin coating method, and it was kept at 100° C. for 3 min. Then, U.V. rays were irradiated to the entire surface of the composition, and it was kept at 200° C. for 60 min to prepare a film having a thickness of 2.7 μm. A $SiO_2$ film having a thickness of 60 nm was formed on the thus prepared film by a sputtering method, and a photoresist was coated on the $SiO_2$ film by a spin coating method. Then, a photomask was disposed on the glass substrate at a side of the $SiO_2$ film, and U.V. rays were exposed to the film, and then, dry etching was conducted. Thus, the diffraction grating 12B as shown in FIG. 2 was prepared wherein the grating pitch was 4 μm and the grating height was 2.7 μm.

The wavelength at the absorption edge of the concavo-convex member was 590 nm, and the absorption coefficient k at 550 nm was 0.29. The refractive index was 1.756 at a wavelength of 650 nm and 1.695 at a wavelength of 790 nm, and the refractive index difference with respect to the above-mentioned two wavelengths was 0.061.

Then, the filling member used in Example 12 was filled in the concavo-convex portion of the grating in the same way. Further, another glass substrate was laminated to sandwich the diffraction grating and the filling member. Then, the lamination was heated at 100° C. for 4 hr to cure the filling member. The refractive index of the filling member after curing was 1.704 at a wavelength of 650 nm and 1.697 at 790 nm.

A semiconductor laser light having a wavelength of 790 nm was irradiated to the thus prepared element. As a result, the transmittance of the 0th-order diffraction light was 97%, and diffraction efficiencies of a +1st-order diffraction light and a −1st-order diffraction light were 0.5% or less respectively. Further, a semiconductor laser light having a wavelength of 650 nm was irradiated. As a result, the transmittance of the 0th-order diffraction light was 70% and diffraction efficiencies of a +1st-order diffraction light, a −1st-order diffraction light and higher-order diffraction lights were 10% respectively. This element exhibited a wavelength-selective diffraction effect with respect to the light having the above-mentioned two wavelengths.

EXAMPLE 14

Figure 12:
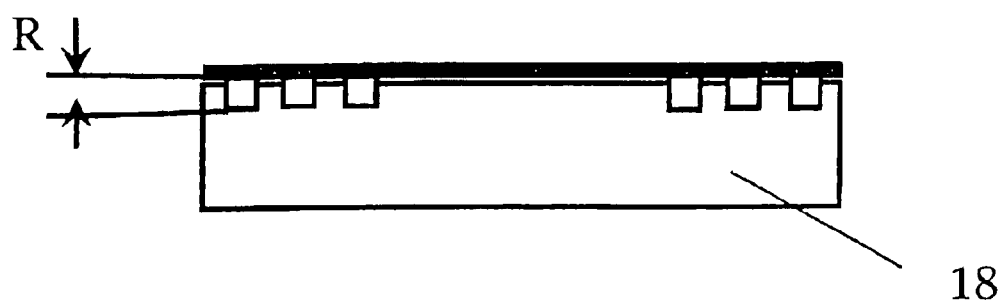
FIG. 12 is a diagram showing an embodiment of the conventional wavelength-selective diffraction element, wherein (a) is a cross-sectional view and (b) is a plan view.
Figure 12:
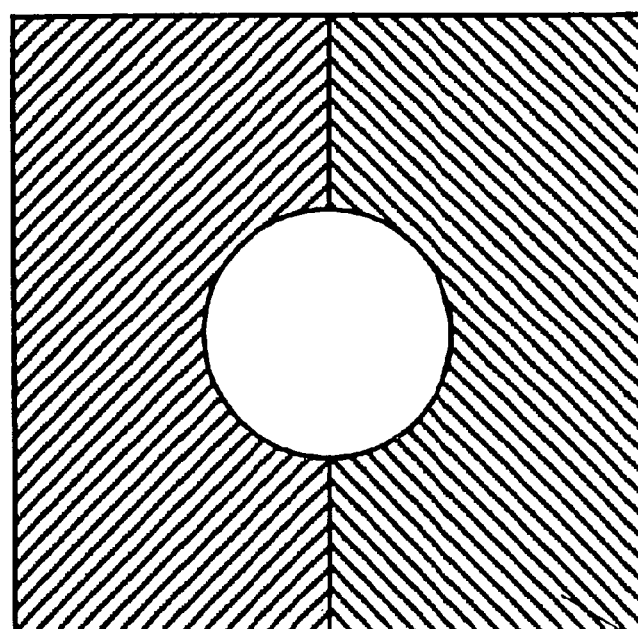
Figure 13:
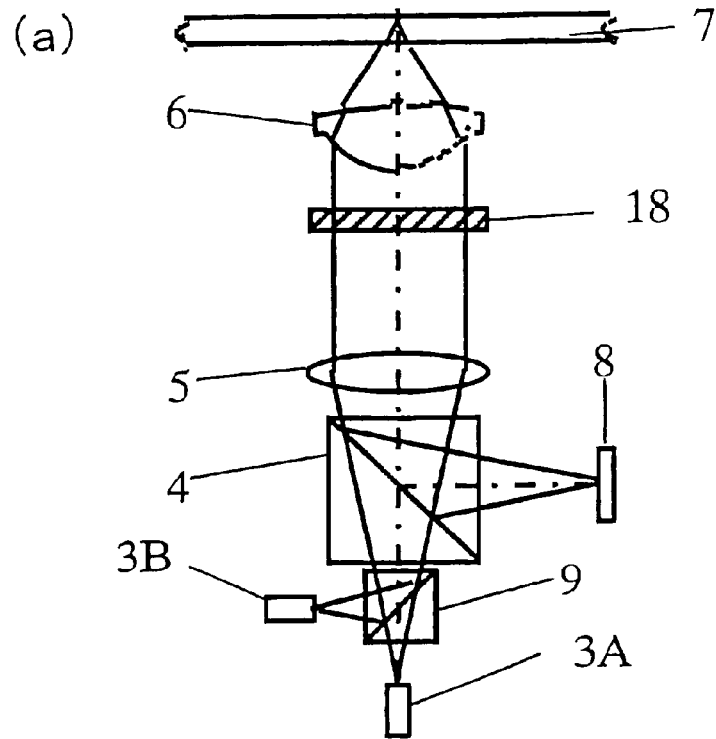
FIG. 13 is a diagram showing another embodiment of the conventional optical head device, wherein (a) is a diagrammatical side view showing a state that recording and reproducing are carried out by using light of a wavelength $\lambda_1$, and (b) is a diagrammatical side view showing a state that recording and reproducing are carried out by using light of a wavelength $\lambda_2$.
Figure 13:
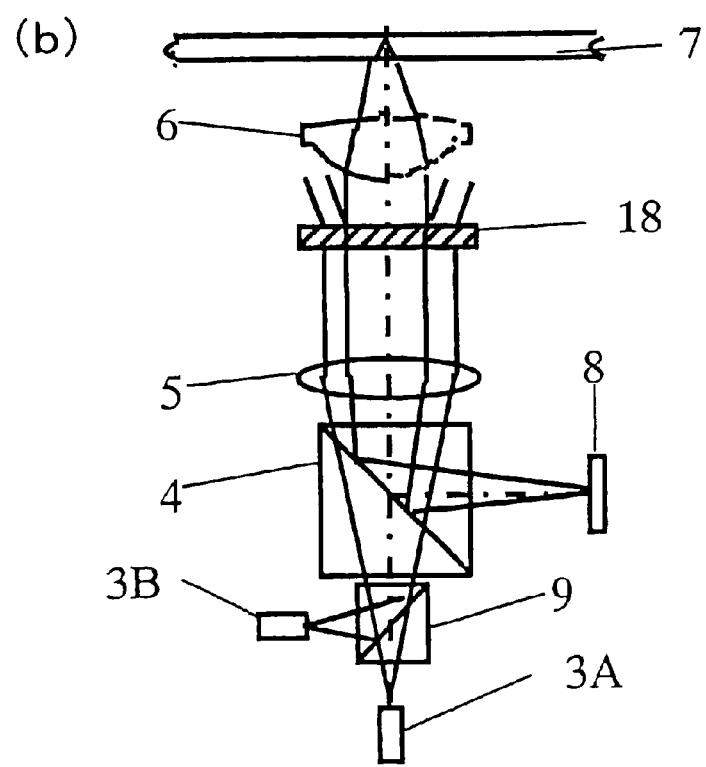
Figure 14:
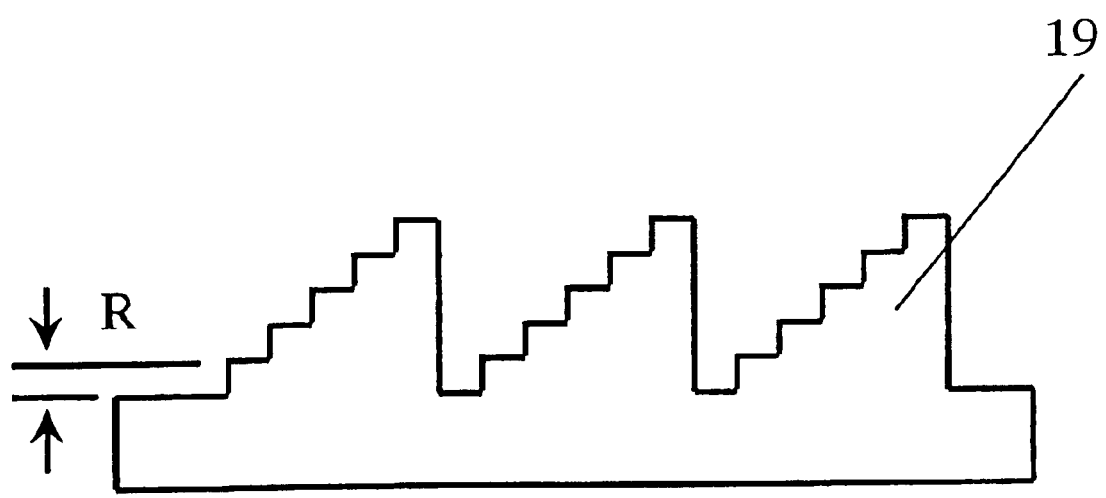
FIG. 14 is a cross-sectional view showing another embodiment of the conventional wavelength-selective diffraction element.
Figure 15:
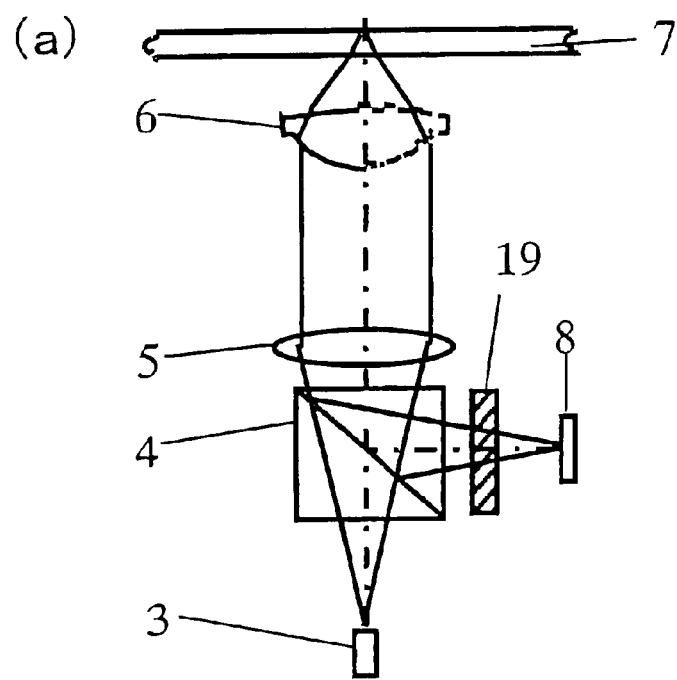
FIG. 15 is a diagram showing another embodiment of the conventional optical head device, wherein (a) is a diagrammatical side view showing a state that recording and reproducing are carried out by using light of a wavelength $\lambda_1$, and (b) is a diagrammatical side view showing a state that recording and reproducing are carried out by using light of a wavelength $\lambda_2$.
Figure 15:
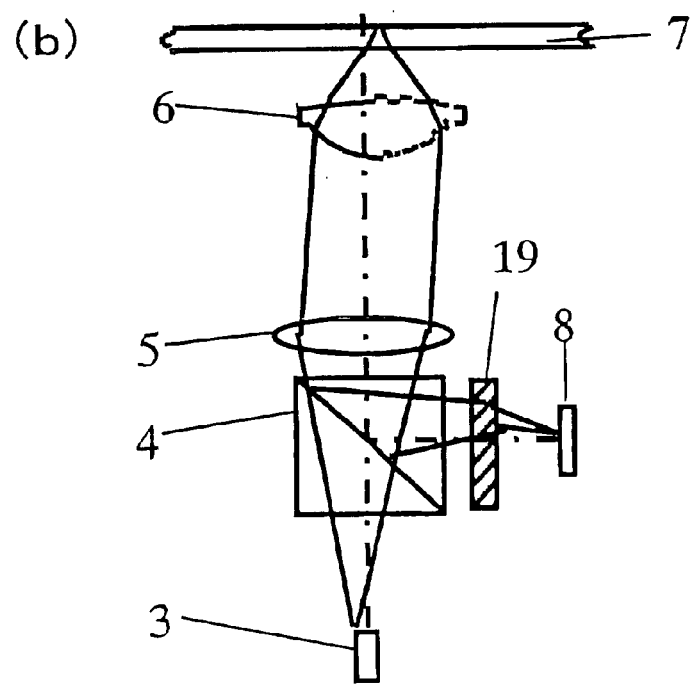

The same composition containing a red organic pigment as used in Example 12 was coated as a concavo-convex member uniformly on a glass substrate by a spin coating method, and it was kept at 100° C. for 3 min. Then, U.V. rays were irradiated to the entire surface of the composition, and it was kept at 200° C. for 60 min to prepare a film having a thickness of 10.0 μm. A $SiO_2$ film having a thickness of 60 nm was formed on the thus prepared film by a sputtering method, and a photoresist was coated on the $SiO_2$ film by a spin coating method. Then, a photomask was disposed on the glass substrate at a side of the $SiO_2$ film, and U.V. rays were irradiated to the film, and then, dry etching was conducted. Thus, a wavelength-selective diffraction element 12H as shown in FIG. 16 was prepared wherein the grating pitch was 10 μm and the grating height was 1.0 μm. This diffraction element is provided with the diffraction grating only in its peripheral portion (FIG. 12(b)).

Then, the filling member used in Example 12 was filled in the concavo-convex portion of the grating in the same way. Further, another glass plate was laminated so as to sandwich the diffraction grating and the filling member. Then, the lamination was heated at 100° C. for 4 hr to cure the filling member. A semiconductor laser light having a wavelength of 650 nm was irradiated to the thus prepared element. As a result, the transmittance of the 0th-order diffraction light was 95%, and diffraction efficiencies of a +1st-order diffraction light and a −1st-order diffraction light were 0.5% or less respectively. Further, a semiconductor laser light having a wavelength of 790 nm was irradiated. As a result, the transmittance of the 0th-order diffraction light was 10%, and this element exhibited a wavelength-selective diffraction effect with respect to the light having the above-mentioned two wavelengths.

EXAMPLE 15

The same composition containing a red organic pigment as used in Example 12 was coated as a concavo-convex member uniformly on a glass substrate by a spin coating method, and it was kept at 100° C. for 3 min. Then, U.V. rays were irradiated to the entire surface of the composition, and it was kept at 200° C. for 60 min to prepare a film having a thickness of 15.0 μm. A $SiO_2$ film having a thickness of 60 nm was formed on the thus prepared film by a sputtering method, and a photoresist was coated on the $SiO_2$ film by a spin coating method. Then, a photomask was disposed on the glass substrate at a side of the $SiO_2$ film, and U.V. rays were irradiated to the film, and then, dry etching was conducted. Then, a step from the formation of the $SiO_2$ film to the dry etching is repeated to thereby prepare a wavelength-selective diffraction element 12J as shown in FIG. 18, wherein the grating pitch was 30 μm, the height of each step was 5.0 μm and the total height was 15.0 μm.

Then, the filling member used in Example 12 was filled in the concavo-convex portion of the grating in the same way. Another glass substrate was laminated so as to sandwich the diffraction grating and the filling member. Then, the lamination was heated at 100° C. for 4 hr to cure the filling member. A semiconductor laser light having a wavelength of 650 nm was irradiated to the thus prepared element. As a result, the transmittance of the 0th-order diffraction light was 90%, and diffraction efficiencies of a +1st-order diffraction light and a −1st-order diffraction light were 0.5% or less respectively. Further, a semiconductor laser light having a wavelength of 790 nm was irradiated. As a result, the transmittance of a +1st-order diffraction light was 75%, and diffraction efficiencies of the 0th-order diffraction light and a −1st-order diffraction light were 0.5% or less respectively. This element exhibited a wavelength-selective diffraction effect with respect to the above-mentioned two wavelengths.

EXAMPLE 16

The optical head device for two wavelengths of this Example has such a structure that the wavelength-selective diffraction element prepared in Example 14 is disposed like a wavelength-selective diffraction element 1H between a collimator lens 5 and an objective lens 6 as shown in FIG. 17. By using the wavelength-selective diffraction element of the present invention, the numerical aperture of light having a wavelength $\lambda_2$ can be reduced without changing the numerical aperture of light having a wavelength $\lambda_1$. Further, since the transmittance of the light having a wavelength $\lambda_1$ does not decrease even when the grating pitch of the diffraction element is made small, the grating pitch can be made small to increase the diffraction angle of the light having a wavelength $\lambda_2$. Accordingly, it was possible to record and reproduce stably information with good S/N with less stray light.

EXAMPLE 17

The optical head device for two wavelengths of this Example has such a structure that the wavelength-selective diffraction element prepared in Example 15 is disposed like a wavelength-selective diffraction element 1J between a beam splitter 4 and a photodetector 8 as shown in FIG. 19. By using the wavelength-selective diffraction element of the present invention, light having a wavelength $\lambda_1$ could be transmitted at a high transmittance, and light having a wavelength $\lambda_2$ could be diffracted at a high diffraction efficiency, and either light having a wavelength $\lambda_1$ or a wavelength $\lambda_2$ could be focused effectively on the light receiving surface of the photodetector 8. Further, it was possible to record and reproduce stably information with good S/N and a smaller number of constituent elements.

INDUSTRIAL APPLICABILITY

As described above, by using the wavelength-selective diffraction element of the present invention, an optical element functioning as a diffraction grating or a holographic beam splitter for generating 3 beams with respect to a specified wavelength, can be realized. When such wavelength-selective diffraction element is installed in an optical head device, it is possible to determine the diffraction efficiency or diffraction angle independently from light for a CD series or DVD series, and accordingly, information in an optical disk of either optical system can be detected optimally.

Further, in the optical head device using the wavelength-selective diffraction element of the present invention, the number of semiconductor lasers can be reduced because a two-wavelength semiconductor laser is mounted. Further, the number of constituent elements can be reduced to thereby realize miniaturization of the device. In addition, in recording and reproducing information in a CD series optical disk and a DVD series optical disk, it is possible to record and reproduce stably with a high utilization efficiency of light.

The entire disclosures of Japanese Patent Application No. 200.1-37552 filed on Feb. 14, 2001 and Japanese Patent Application No. 2001-378925 filed on Dec. 12, 2001 including specifications, claims, drawings and summaries are incorporated herein by reference in their entireties.

What is claimed is:

1. A wavelength-selective diffraction element adapted to receive two kinds of light having a wavelength $\lambda_1$ and a wavelength $\lambda_2$ ($\lambda_1 < \lambda_2$), characterized in that the wavelength-selective diffraction element comprises a transparent substrate, a grating comprising a concavo-convex member having a periodically recessed and projected shape formed on a front surface of the transparent substrate and a filling member filled in at least a recessed portion of the grating, wherein either of the concavo-convex member or the filling member contains an organic pigment having the absorption edge of light in a region having a shorter wavelength than the wavelength $\lambda_1$; the concavo-convex member and the filling member have the same refractive index with respect to either one of light having a wavelength $\lambda_1$ and light having a wavelength $\lambda_2$, and they have different refractive indices with respect to the other light having a wavelength.

2. The wavelength-selective diffraction element according to claim 1, wherein a transparent substrate other than said transparent substrate is disposed to oppose to said transparent substrate with respect to the concavo-convex member.

3. The wavelength-selective diffraction element according to claim 1, wherein said concavo-convex member contains an organic pigment having the absorption edge of light in a region having a shorter wavelength than the wavelength $\lambda_1$.

4. The wavelength-selective diffraction element according to claim 1, wherein the grating having a periodically recessed and projected shape is formed only in a peripheral portion of the front surface of the transparent substrate.

5. The wavelength-selective diffraction element according to claim 1, wherein the grating having a periodically recessed and projected shape has a blazed shape or a pseudo-blazed shape.

6. A wavelength-selective diffraction element comprising the wavelength-selective diffraction element according to claim 1, wherein the light having a wavelength $\lambda_1$ is transmitted without being diffracted and the light having a wavelength $\lambda_2$ is diffracted, and the wavelength-selective diffraction element according to claim 1 wherein the light having a wavelength $\lambda_2$ is transmitted without being diffracted and the light having a wavelength $\lambda_1$ is diffracted, wherein these wavelength-selective diffraction elements are laminated.

7. The wavelength-selective diffraction element according to claim 6, wherein a phase plate is laminated at an outside of the laminated wavelength-selective diffraction elements.

8. The wavelength-selective diffraction element according to claim 6, wherein a phase plate is disposed between two wavelength-selective diffraction elements.

9. The wavelength-selective diffraction element according to claim 1, wherein the organic pigment is a red organic pigment.

10. An optical head device comprising a light source for emitting two kinds of light having a wavelength $\lambda_1$ and a wavelength $\lambda_2$, an objective lens for collecting the two kinds of light to an optical recording medium and a photodetector for detecting reflection light of the two kinds of light reflected at the optical recording medium, characterized in that the wavelength-selective diffraction element defined in claim 1 is disposed in an optical path between the light source and the objective lens of the optical head device.

* * * * *